(12) United States Patent
Poustchi et al.

(10) Patent No.: US 7,441,141 B2
(45) Date of Patent: Oct. 21, 2008

(54) BACK UP OF NETWORK DEVICES

(75) Inventors: Behrouz Poustchi, Ottawa (CA); Natalie Ann Gagnon, Carleton Place (CA); Jennifer Bell, Ottawa (CA)

(73) Assignee: Avaya Canada Corp., Halifax (CA)

( * ) Notice: Subject to any disclaimer, the term of this patent is extended or adjusted under 35 U.S.C. 154(b) by 703 days.

(21) Appl. No.: 10/993,519

(22) Filed: Nov. 22, 2004
(Under 37 CFR 1.47)

(65) Prior Publication Data
US 2005/0193249 A1   Sep. 1, 2005

Related U.S. Application Data

(60) Provisional application No. 60/523,703, filed on Nov. 21, 2003.

(51) Int. Cl.
*G06F 11/00* (2006.01)
(52) U.S. Cl. .......................................................... 714/4
(58) Field of Classification Search ...................... 714/4
See application file for complete search history.

(56) References Cited

U.S. PATENT DOCUMENTS

| | | | |
|---|---|---|---|
| 5,926,619 A * | 7/1999 | Badovinatz et al. ............. 714/4 |
| 6,292,905 B1 * | 9/2001 | Wallach et al. ................. 714/4 |
| 6,477,172 B1 * | 11/2002 | Burger et al. ................ 370/406 |
| 6,505,216 B1 | 1/2003 | Schutzman et al. |
| 6,560,617 B1 * | 5/2003 | Winger et al. ................ 707/204 |
| 6,665,395 B1 | 12/2003 | Busey et al. |
| 6,768,731 B1 | 7/2004 | Huh |
| 7,035,289 B2 * | 4/2006 | Devine et al. ................ 370/493 |
| 7,127,613 B2 | 10/2006 | Pabla et al. |
| 7,162,013 B2 | 1/2007 | Gavette et al. |
| 7,379,540 B1 * | 5/2008 | Van Gundy .............. 379/88.18 |
| 2002/0136182 A1 * | 9/2002 | Bardehle ................... 370/338 |
| 2003/0018657 A1 | 1/2003 | Monday |
| 2003/0120819 A1 | 6/2003 | Abramson et al. |
| 2003/0126247 A1 | 7/2003 | Strasser et al. |
| 2003/0167343 A1 * | 9/2003 | Furuno ........................ 709/244 |
| 2004/0070515 A1 | 4/2004 | Burkley et al. |
| 2004/0156485 A1 | 8/2004 | Poustchi et al. |

(Continued)

FOREIGN PATENT DOCUMENTS

WO    WO 01/06367 A1    1/2001

(Continued)

*Primary Examiner*—Joshua A Lohn
(74) *Attorney, Agent, or Firm*—Muncy, Geissler, Olds & Lowe PLLC

(57) ABSTRACT

A network device selects at least one other network device as its backup and communicates information for use by the backup network device(s) in assuming the role of the network device upon its unavailability. The network device also receives information from at least one network device that has selected it as its backup device for use in assuming the role of the selecting device(s) upon unavailability of the selecting device(s). Each network device may act as a backup for the same number of devices as it has backups. Selection of backup devices may be based on device reliability. In one embodiment, each network device has a primary and secondary backup. The primary backup assumes the role of the network device when the latter becomes unavailable, and the secondary backup assumes the role of the network device when both the network device and its primary backup are unavailable.

78 Claims, 18 Drawing Sheets

| DN | MAC ADDRESS | IP ADDRESS | DEV | BACKUP A | TYPE | BACKUP B | TYPE | ACTIVE | CLASS |
|---|---|---|---|---|---|---|---|---|---|
| 201 | 00-05-78-6B-44-B1 | 192.168.1.1 | SET | 00-05-78-6B-44-B3 (DN 205) | PRI | 00-05-78-6B-44-B4 (DN 207) | SEC | TRUE | 1 |
| 202 | 00-05-78-6B-44-B2 | 192.168.1.2 | SET | 00-05-78-6B-44-B4 (DN 207) | PRI | 00-05-78-6B-44-B6 (DN 208) | SEC | TRUE | 1 |
| 203 | 00-05-78-6B-44-A1 | 192.168.1.3 | SET | 00-05-78-6B-44-B1 (DN 201) | PRI | 00-05-78-6B-44-B3 (DN 205) | SEC | TRUE | 2 |
| 204 | 00-05-78-6B-44-A2 | 192.168.1.4 | SET | 00-05-78-6B-44-B2 (DN 202) | PRI | 00-05-78-6B-44-B5 (DN 206) | SEC | TRUE | 2 |
| 205 | 00-05-78-6B-44-B3 | 192.168.1.5 | SET | 00-05-78-6B-44-B5 (DN 206) | PRI | 00-05-78-6B-44-B7 (DN 209) | SEC | TRUE | 1 |
| 206 | 00-05-78-6B-44-B5 | 192.168.1.6 | SET | 00-05-78-6B-44-B7 (DN 209) | PRI | 00-05-78-6B-44-A2 (DN 204) | SEC | TRUE | 1 |
| 207 | 00-05-78-6B-44-B4 | 192.168.1.7 | SET | 00-05-78-6B-44-B6 (DN 208) | PRI | 00-05-78-6B-44-A1 (DN 203) | SEC | TRUE | 1 |
| 208 | 00-05-78-6B-44-B6 | 192.168.1.8 | SET | 00-05-78-6B-44-B1 (DN 201) | PRI | 00-05-78-6B-44-A1 (DN 203) | SEC | TRUE | 1 |
| 209 | 00-05-78-6B-44-B7 | 192.168.1.9 | SET | 00-05-78-6B-44-B2 (DN 202) | PRI | 00-05-78-6B-44-A2 (DN 204) | SEC | TRUE | 1 |
| 200 | 00-05-78-6B-44-B8 | 192.168.1.10 | TTI | 00-00-00-00-00-00 | PRI | 00-00-00-00-00-00 | SEC | TRUE | 1 |

U.S. PATENT DOCUMENTS

| | | | |
|---|---|---|---|
| 2005/0021849 A1* | 1/2005 | Hipfinger | 709/239 |
| 2005/0060356 A1* | 3/2005 | Saika | 707/204 |
| 2005/0238148 A1 | 10/2005 | Poustchi et al. | |
| 2006/0067323 A1* | 3/2006 | Beck et al. | 370/395.2 |

FOREIGN PATENT DOCUMENTS

| | | |
|---|---|---|
| WO | WO 03/096189 A1 | 11/2003 |
| WO | WO 2004/051944 A1 | 6/2004 |

\* cited by examiner

| DN | MAC ADDRESS | IP ADDRESS | DEV | BACKUP A | TYPE | BACKUP B | TYPE | ACTIVE | CLASS |
|---|---|---|---|---|---|---|---|---|---|
| 201 | 00-05-78-6B-44-B1 | 192.168.1.1 | SET | 00-05-78-6B-44-B3 (DN 205) | PRI | 00-05-78-6B-44-B4 (DN 207) | SEC | TRUE | 1 |
| 202 | 00-05-78-6B-44-B2 | 192.168.1.2 | SET | 00-05-78-6B-44-B4 (DN 207) | PRI | 00-05-78-6B-44-B6 (DN 208) | SEC | TRUE | 1 |
| 203 | 00-05-78-6B-44-A1 | 192.168.1.3 | SET | 00-05-78-6B-44-B1 (DN 201) | PRI | 00-05-78-6B-44-B3 (DN 205) | SEC | TRUE | 2 |
| 204 | 00-05-78-6B-44-A2 | 192.168.1.4 | SET | 00-05-78-6B-44-B2 (DN 202) | PRI | 00-05-78-6B-44-B5 (DN 206) | SEC | TRUE | 2 |
| 205 | 00-05-78-6B-44-B3 | 192.168.1.5 | SET | 00-05-78-6B-44-B5 (DN 206) | PRI | 00-05-78-6B-44-B7 (DN 209) | SEC | TRUE | 1 |
| 206 | 00-05-78-6B-44-B5 | 192.168.1.6 | SET | 00-05-78-6B-44-B7 (DN 209) | PRI | 00-05-78-6B-44-A2 (DN 204) | SEC | TRUE | 1 |
| 207 | 00-05-78-6B-44-B4 | 192.168.1.7 | SET | 00-05-78-6B-44-B6 (DN 208) | PRI | 00-05-78-6B-44-A1 (DN 203) | SEC | TRUE | 1 |
| 208 | 00-05-78-6B-44-B6 | 192.168.1.8 | SET | 00-05-78-6B-44-B1 (DN 201) | PRI | 00-05-78-6B-44-A1 (DN 203) | SEC | TRUE | 1 |
| 209 | 00-05-78-6B-44-B7 | 192.168.1.9 | SET | 00-05-78-6B-44-B2 (DN 202) | PRI | 00-05-78-6B-44-A2 (DN 204) | SEC | TRUE | 1 |
| 200 | 00-05-78-6B-44-B8 | 192.168.1.10 | TTI | 00-00-00-00-00-00 | PRI | 00-00-00-00-00-00 | SEC | TRUE | 1 |

FIG. 5

BACK UP OF NETWORK DEVICES

CROSS REFERENCE TO RELATED APPLICATIONS

The present application claims the benefit of prior provisional application Ser. No. 60/523,703 filed Nov. 21, 2003, the contents of which are hereby incorporated by reference hereinto.

FIELD OF THE INVENTION

The invention relates to back up of network devices, such as back up of peers in a distributed peer-to-peer communications network for example.

BACKGROUND OF THE INVENTION

In many known circuit-switched or packet-switched telephony solutions, a centralized piece of equipment (e.g. a switch or Private Branch Exchange (PBX)) provides call termination, call processing, switching and/or call handling capabilities. In large systems, the central equipment may be a powerful computer controlling a number of functions on circuit boards called line cards, which connect telephone sets to the computer. In small systems (e.g. in systems having ten or fewer terminal sets), the central intelligence may actually reside in a "golden" telephone set that is specially designed to hold the central processing equipment.

Regardless of the form the central equipment takes, a number of terminal sets (e.g. wired or wireless telephone sets) are usually connected to the central equipment. The terminal sets are typically "dumb" devices in comparison to the central equipment. That is, terminal sets may simply send hookswitch information and key presses (e.g. Dual Tone Multi-Frequency or DTMF tones) to the central equipment and convert signals from the central equipment such as a dial-tone, ringing tone, or voice signals into sound (or, in some cases, images or video). The terminal sets are typically unaware of the existence of any other terminal sets, and have no inherent capacity to interconnect themselves with another terminal set.

In centralized telephony systems, administration and discovery of telephone sets within a network is typically performed by the central equipment. For example, in a traditional circuit-switched Time Division Multiplexing (TDM) telephony system, for example, each terminal set may be connected to a port on the central call processing equipment. Typically, as part of an initialization sequence which occurs on power-up, each terminal set announces its availability to the central equipment. The central equipment monitors each port for such announcements as new terminal sets are connected, and is thus capable of "discovering" newly-added terminal sets.

In centralized Voice-over Internet Protocol (IP) or VoIP telephony systems, a very similar but slightly more complicated procedure is employed; however, a terminal set still announces its availability to the central call processing equipment via the network. As is known in the art, VoIP is the transmission of calls over a data network based on the IP. Communication takes the form of packet data, thus there is no fixed connection as in the case of circuit-switched networks. The communication can be text, voice, graphics or video. IP equipment may adhere to such standards as H.323 and Session Initiation Protocol (SIP) for interoperability. The H.323 standard generally describes how multimedia communication is to occur between terminals, network equipment and services. The SIP standard covers the technical requirements to set up, modify and tear down multimedia sessions over the Internet. As used herein, the term "call" refers to a multimedia communication between two endpoints, and includes a voice telephone call.

Regardless of whether central equipment is circuit switched or packet switched, during the course of discovering a new terminal set the central equipment will usually automatically assign and manage a Directory Number (DN), which is a form of network address. The DN may be, e.g., a PBX extension. As DNs are assigned to different sets, the DNs are added to a list of DNs maintained at the central equipment. Often, it is only on the basis of this centralized list that the centralized equipment is able to determine the identity of the physical terminal set that should be called when a DN is forwarded from a calling terminal set.

In centralized systems, call treatment options for each terminal set are also typically stored centrally and remain available even if the associated terminal set has been disconnected from the central equipment. The term "call treatment options" refers to settings which determine how incoming calls are to be handled, e.g. how many rings should occur before forwarding to voicemail, or whether to automatically forward a call to another extension. Because the call treatment options remain available, incoming calls intended for a terminal set which has become disconnected may nevertheless be handled in the same manner as when the terminal set was connected.

As the costs associated with greater processing capacity and memory continue to decrease, the inclusion of a call-processing engine in every telephone set connected to a network is becoming feasible. In such systems, it may be desirable to eliminate the central equipment. Such a decentralized system may be referred to as a distributed telephony system.

In a distributed telephony system, storage of call treatment options for a terminal set at central equipment is not possible because no central equipment exists. Call treatment options could be stored at the individual terminal set to which they apply. However, if such a terminal set were to become disconnected or otherwise inactive, the call treatment options for that terminal set may be inaccessible. It would be desirable for the call treatment options for a terminal set to remain available even when the terminal set has become unavailable.

More generally, it would be desirable for data specific to one network device to be available even upon the unavailability of that network device, so that it may be possible for another network device to assume the role of the unavailable network device during its unavailability.

SUMMARY OF THE INVENTION

A network device selects at least one other network device as its backup and communicates information for use by the backup network device(s) in assuming the role of the network device upon its unavailability. The network device also receives information from at least one network device that has selected it as its backup device for use in assuming the role of the selecting device(s) upon unavailability of the selecting device(s). Each network device may act as a backup for the same number of devices as it has backups. Selection of backup devices may be based on device reliability. In one embodiment, each network device has a primary and secondary backup. The primary backup assumes the role of the network device when the latter becomes unavailable, and the secondary backup assumes the role of the network device when both the network device and its primary backup are unavailable.

In accordance with an aspect of the present invention there is provided at one network device of a plurality of network devices, a method comprising: selecting at least one other network device of said plurality of network devices to act as a backup for said one network device, said selecting resulting in the selection of at least one backup network device; communicating information maintained by said one network device to each said backup network device, said communicated information for use by said backup network device in assuming the role of said one network device upon unavailability of said one network device; and receiving information from at least one network device distinct from said one network device which has selected said one network device as its backup so as to become a master network device, said received information for use by said one network device in assuming the role of the master network device upon unavailability of the master network device.

In accordance with another aspect of the present invention there is provided a network device of a plurality of network devices, adapted to: select at least one other network device of said plurality of network devices to act as a backup for said one network device, said selecting resulting in the selection of at least one backup network device; communicate information maintained by said one network device to each said backup network device, said communicated information for use by said backup network device in assuming the role of said one network device upon unavailability of said one network device; and receive information from at least one network device distinct from said one network device which has selected said one network device as its backup so as to become a master network device, said received information for use by said one network device in assuming the role of the master network device upon unavailability of the master network device.

In accordance with yet another aspect of the present invention there is provided a machine-readable medium including machine-executable code for execution at one network device of a plurality of network devices, comprising: machine-executable code for selecting at least one other network device of said plurality of network devices to act as a backup for said one network device, said selecting resulting in the selection of at least one backup network device; machine-executable code for communicating information maintained by said one network device to each said backup network device, said communicated information for use by said backup network device in assuming the role of said one network device upon unavailability of said one network device; and machine-executable code for receiving information from at least one network device distinct from said one network device which has selected said one network device as its backup so as to become a master network device, said received information for use by said one network device in assuming the role of the master network device upon unavailability of the master network device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 5 is a routing table of an exemplary terminal set of FIG. 1;

DETAILED DESCRIPTION

Figure 1:
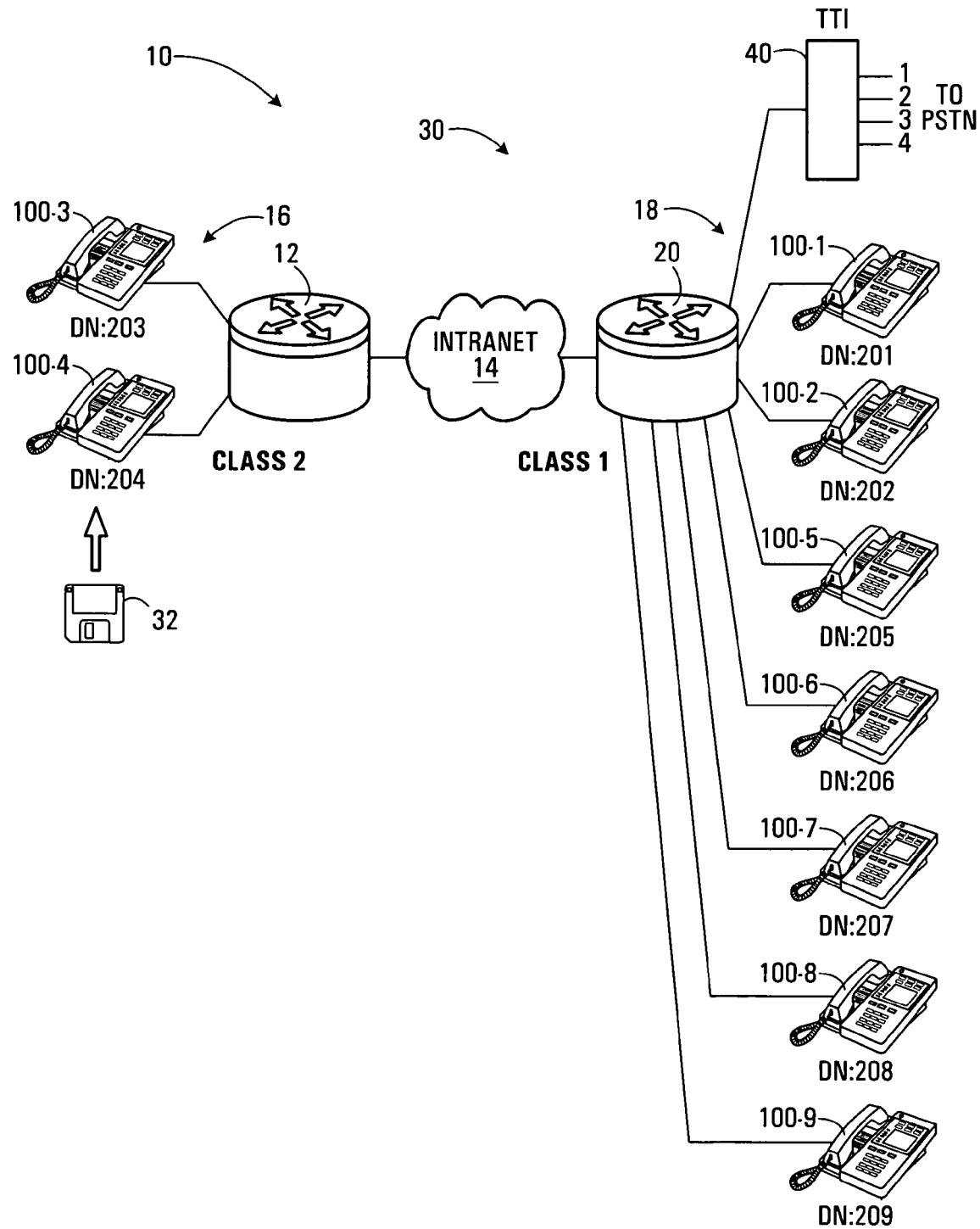
FIG. 1 is a telephone system which makes use of peer backup according to an embodiment of the invention.

In overview, a terminal set in a distributed telephony system including multiple terminal sets is presumed to have an awareness of the other terminal sets in the system, e.g. from having performed peer discovery. This awareness includes an indication of the reliability of each terminal set in the system. In this context, "reliability" refers to the ability of a terminal set to reliably establish a connection outside of the distributed telephony system. For example, in a telephony system which includes two sub-networks joined by a bridging connection (e.g. an intranet), if the first sub-network has an external connection to, e.g., the Public Switched Telephone Network (PSTN) while the second sub-network does not, the ability of terminal sets on the second sub-network to establish a connection with the PSTN depends upon the continued operation of the bridging connection. In this example, terminal sets on the second sub-network are said to have a lower reliability than terminal sets on the first sub-network, which can establish connections to the PSTN regardless of the operative state of the bridging connection.

Using this information, each terminal set engages in peer backup selection. The objective of peer backup selection is for the current terminal set to select a primary backup terminal set and a secondary backup terminal set. A backup terminal set (or simply "backup") is a terminal set which is able to assume the role of the current terminal set (possibly including such capabilities as emulating call handling options and voicemail greetings of the current set for example) in the event that the current terminal set becomes unavailable (e.g. becomes disconnected, loses power, or otherwise enters a state in which it is unable to take an incoming call). More specifically, a primary backup terminal set is capable of assuming the role of the current terminal set upon the unavailability of the current terminal set, while a secondary backup terminal set is capable of assuming the role of the current terminal set if both of the current terminal set and the primary backup have become unavailable. Primary backups may also be referred to as "first level" backups and secondary backups may be referred to as "second level" backups. In general, backups may alternatively be referred to as "slaves". Terminal sets to which slaves have been assigned may be referred to as "assignee" or "master" terminal sets.

To determine which of the other terminal sets a current terminal set should select as its backups, the reliability of the current terminal set as well as the reliability of prospective backups are both taken into consideration, as follows.

All of the terminal sets in the system are grouped into M pools of prospective backups, where M is an integer greater than or equal to one. The basis for the creation of the M pools is the reliability of the terminal sets: each terminal set is placed into a pool of prospective backups with like reliability. The pool having the highest reliability terminal sets is initially chosen as the "current" pool of prospective backups. A "current backup level" is set to "first level" to reflect the fact that all terminal sets will receive a primary (i.e. first level) backup first, before any secondary backups are assigned.

Thereafter, terminal sets from the current pool are assigned as primary backups to all of the terminal sets in the system, in increasing order of reliability of the assignee terminal sets (i.e. lowest reliability terminal sets receive backups first). The backups are assigned so that no terminal set receives more than one primary backup.

Assigning continues until either (a) every terminal set in the current pool of prospective backups has been assigned twice (two being the number of masters to which each terminal set in the pool is assigned as a slave); or (b) every terminal set in the system has received a primary backup.

Upon the occurrence of (a), the next pool of prospective backups is chosen, in decreasing order of reliability (i.e. the next lower reliability pool of prospective backups becomes the current pool), and assigning continues as described above.

Upon the occurrence of (b), assignment of primary backups will be complete. Thereafter, the "current backup level" is changed from first level (primary) to second level (secondary), and assigning of secondary backups proceeds in the same manner as for primary backups.

Once all of the secondary backups have been assigned, backup selection will be complete. At this stage, the current terminal set will be cognizant of which terminal sets have been assigned as primary and secondary backups for each terminal set in the system. This information may be stored in the form of a routing table which includes other information about each terminal set, such as directory number (analogous to a PBX extension) and an IP address (used for placing VoIP calls for example). However, in order to cement the master/slave relationships, communications between each master terminal set and its assigned slaves is still required, as follows.

By examining its routing table, the current terminal set is able to identify which two terminal sets have been assigned as its primary and secondary backups. Using this information, the current terminal set sends a request message to each of the identified terminal sets to formally request them to become its slaves.

Assuming each terminal gives its consent to becoming a slave for the current terminal set, the current terminal set sends a copy of its local database to the slave terminal set, which the slave stores locally to itself. Such database copies are referred to as "shadow" databases. The shadow database contains information which is necessary for the slave to be able to assume the role of (i.e. to emulate the operation of) the master terminal set if the master should become unavailable. This information may include call handling options or a voicemail greeting, for example.

Simultaneously, the current terminal set will receive requests from two other terminal sets asking it to act as their slave. Upon consenting, the current terminal set will receive copies of the requesting sets' databases for local storage in the form of "shadow" databases at the current terminal set.

During system operation, it is possible that the information in a master's database may change. For example, a user of the master terminal set may update the configuration of the terminal set, e.g., so that incoming calls are forwarded directly to voicemail rather than causing the terminal set to ring first. In this situation, after updating its own database, the master will communicate the changed information to each slave, to maintain coherence between the master's database and the slaves' shadow databases.

In the event of the unavailability of a master terminal set, the primary terminal set will assume the role of the master. For example, when a calling terminal set is unable to connect to an unavailable terminal set, it will utilize its locally-maintained routing table to identify which terminal set acts as the primary backup for the unavailable set. It will then attempt to connect with the identified primary backup, in such a manner that the primary backup will know that the call was originally intended for the unavailable master. Assuming it is active, the primary backup will accept the call in the same manner as the master would have accepted the call (e.g. with the same call handling options and voicemail greeting), such that the unavailability of the master may not even be noticed by a calling party.

If the primary backup is also unavailable, an attempt is made to connect to the secondary backup, in a similar fashion.

If both of the primary and secondary terminal sets are unavailable, the calling party's terminal set may accept the call in a generic fashion (i.e. without the benefit of a copy of the unavailable master's database).

While a slave terminal set is emulating its master, any changes to the master's configuration that are made at the slave terminal set will result in changes to the slave's shadow database for that master. These changes are tracked by the slave and are reported to the other slave serving the same master, so that the other slave can maintain coherence of its shadow database with the shadow database of the current slave. As well, the tracked changes will be sent to the master when it once again becomes active, so that the master will benefit from any configuration changes made to the slave (in its capacity as a backup for the master) during the master's unavailability.

When a terminal set is added to a distributed telephony system in which primary and secondary backups have already been assigned, the new terminal set may send a request to an existing master terminal set asking that master to surrender one of its backups. For example, if the new terminal set determines that both of a primary backup and a secondary backup of an existing master terminal set are of the highest reliability, the new terminal set may ask the master to surrender its secondary backup for use by the new terminal set as its primary backup. In this case the new terminal set sends a preemption request to the existing master. Upon surrendering of the backup by the master, the new terminal set claims the preempted backup terminal set as its own primary backup and performs the necessary information exchange therewith. The surrendering master may then assign the new terminal set as its secondary backup and perform the necessary information exchange therewith. This is repeated in order to acquire a secondary backup for the new terminal set. Each of the surrendering terminal sets may then assign the new terminal set as its backup.

During system operation, each terminal set periodically notifies all other terminal sets of the identity of its current primary and secondary backups (using a PEER_ASSERT "heartbeat" message, which is described in more detail below). If the identity of a terminal set's backups changes, other terminal sets will be made aware of the change by way of these messages and will update their routing tables accordingly.

Referring to FIG. 1, shown is a distributed telephony system 10 (or "telephone system 10") which makes use of network based distributed peer-to-peer call processing, and which performs peer backup according to an embodiment of the invention. The telephone system 10 includes two Local Area Networks (LANS) 16 and 18 interconnected by a bridging connection comprising an intranet 14 to form an overall network 30. Alternative embodiments may employ a different form of bridging connection (e.g. a Virtual Private Network (VPN) tunnel connecting two offices via the public internet). LANs 16 and 18 may be referred to simply as networks 16 and 18, or as sub-networks 16 and 18 to connote the existence of an overall network 30. The first sub-network 16 includes two terminal sets 100-3 and 1004 interconnected by a switch 12. The second sub-network 18 includes seven terminal sets 100-1, 100-2 and 100-5 to 100-9 interconnected by a switch 20. Switches 12 and 20 could be replaced with network hubs.

Sub-network 18 also includes a Thin Trunk Interface (TTI) 40 which provides the sub-network 18 with external connectivity. TTI 40 may for example be a basic analog or digital T1/E1 interface or any other PSTN interface and provides a local central office or PSTN interworking interface and is coupled to a number of external telephone "lines" 1, 2, 3, 4. Lines 1, 2, 3, 4 are wire pairs representative of facilities provided by a local central office or PSTN (not shown). In some embodiments of the invention, there are many external lines such that multiple TTIs may be required. For example, if eight lines are required to the PSTN then a second TTI can be added to the system 10.

Given the configuration of the network 30 of FIG. 1, it should be apparent that the ability of some terminal sets to establish connections with the PSTN (or, more generally, to establish connections outside the overall network 30) may be more susceptible to interruption or failure than the ability of other terminal sets to establish connections with the PSTN. For example, by virtue of the existence of a TTI 40 on sub-network 18, the terminal sets that are directly connected to sub-network 18, i.e. terminal sets 100-1, 100-2 and 100-5 to 100-9, may enjoy relatively reliable connectivity to the PSTN. In contrast, by virtue of absence of a TTI on sub-network 12, the terminal sets that are directly connected to sub-network 12, i.e. terminal sets 100-3 and 100-4, may have less reliable connectivity to the PSTN. That is, while terminal sets 100-3 and 100-4 may be able to access the PSTN via intranet 14 and sub-network 18, their PSTN connectivity is considered less reliable due to the possibility of failure of intermediary intranet 14. The probability that a (sub-)network will be able to maintain external connectivity is represented by a class number. As used herein, lower class numbers indicate more reliable external connectivity. Thus, sub-network 18 may be deemed to be a class 1 (i.e. more reliable) network, while sub-network 12 is deemed to be a class 2 (i.e. less reliable) network. Accordingly, all of the terminal sets on sub-network 18 are deemed to be more reliable than any of the terminal sets on sub-network 12.

Only nine terminal sets are illustrated in FIG. 1. Generally, there may be a total of T terminal sets where $T \geq 2$. In some embodiments of the invention T is a large number, for example in the thousands.

Unlike conventional centralized telephony systems, the system 10 of FIG. 1 features distributed call processing. This distributed call processing may feature a number of capabilities including distributed voice mail for example.

Figure 2:
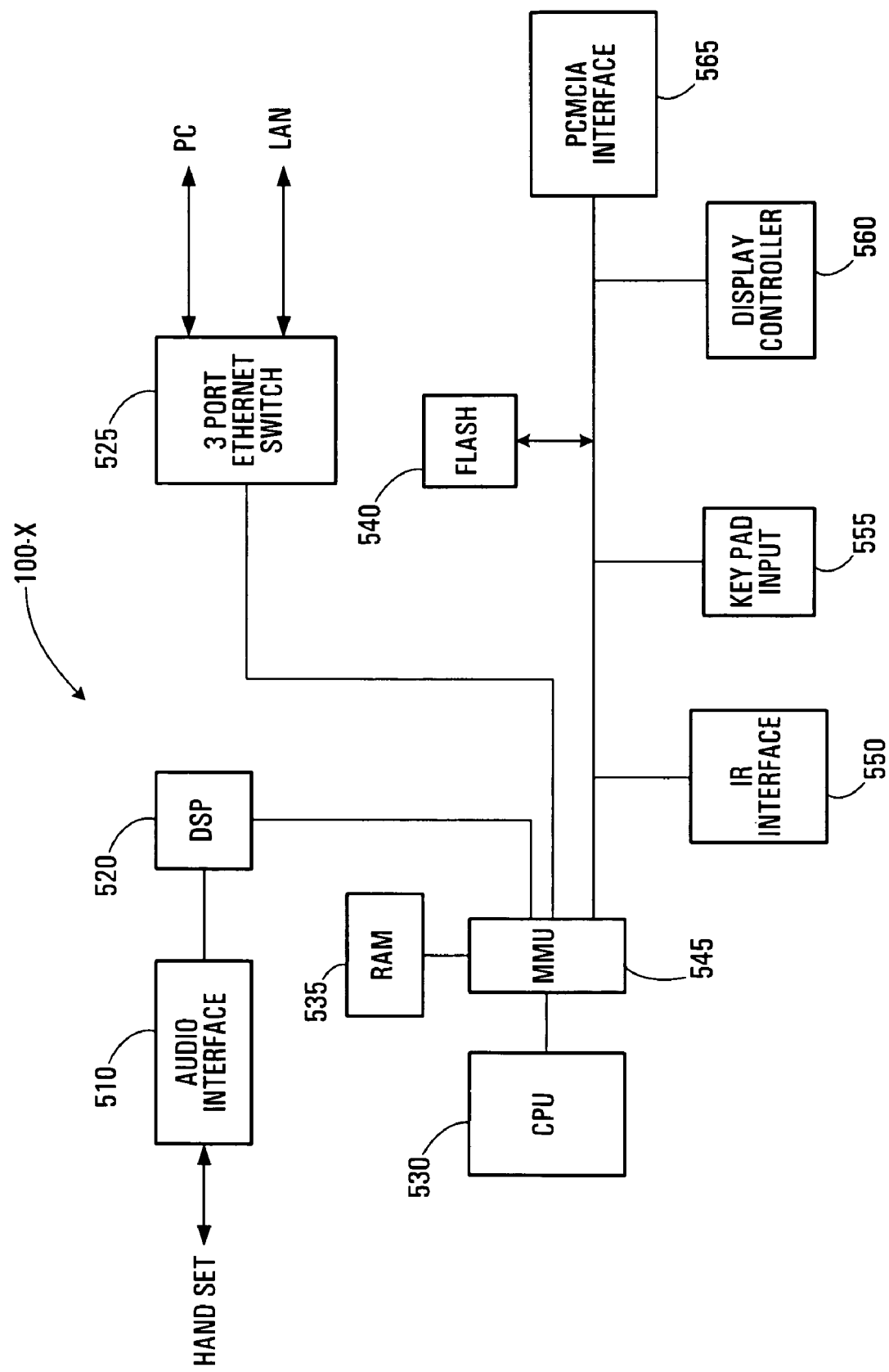
FIG. 2 is a partial circuit block diagram of each terminal set shown in FIG. 1.

Referring to FIG. 2, shown is a partial circuit block diagram of an exemplary telephone set 100-X (where X=1 to 9) of the telephone system 10 of FIG. 1. A Central Processor Unit (CPU) 530, a Memory Management Unit (MMU) 545 and a Random Access Memory (RAM) 535 provide the basis of a computational device. This computational device is connected to a Digital Signal Processor (DSP) 520 for encoding and decoding audio signals. The DSP 520 connects to an audio interface 510. The computational device is also connected to a 3-port switch 525 to allow connection to a LAN and a Personal Computer (PC). The computational device is also connected to a host of peripherals such as a Flash non-volatile memory 540, an Infra Red (IR) interface 550, a Keypad and button interface 555, a Liquid Crystal Display (LCD) controller 560, and a Personal Computer Memory Card International Association (PCMCIA) Interface 565 to allow for standardized expansion of the terminal set 100. While a specific architecture is shown, more generally any packet based (e.g. Internet. Protocol (IP)) telephone may be used, assuming sufficient processing and memory capacity is available to implement the methods described below. For example, an off-the-shelf IP phone such as those manufactured by Mitel, Nortel Networks, Avaya, Siemens, NEC, Pingtel or 3COM could be used (e.g. Nortel i2004, Siemens optiPoint 410, or Avaya 4610).

Figure 3:
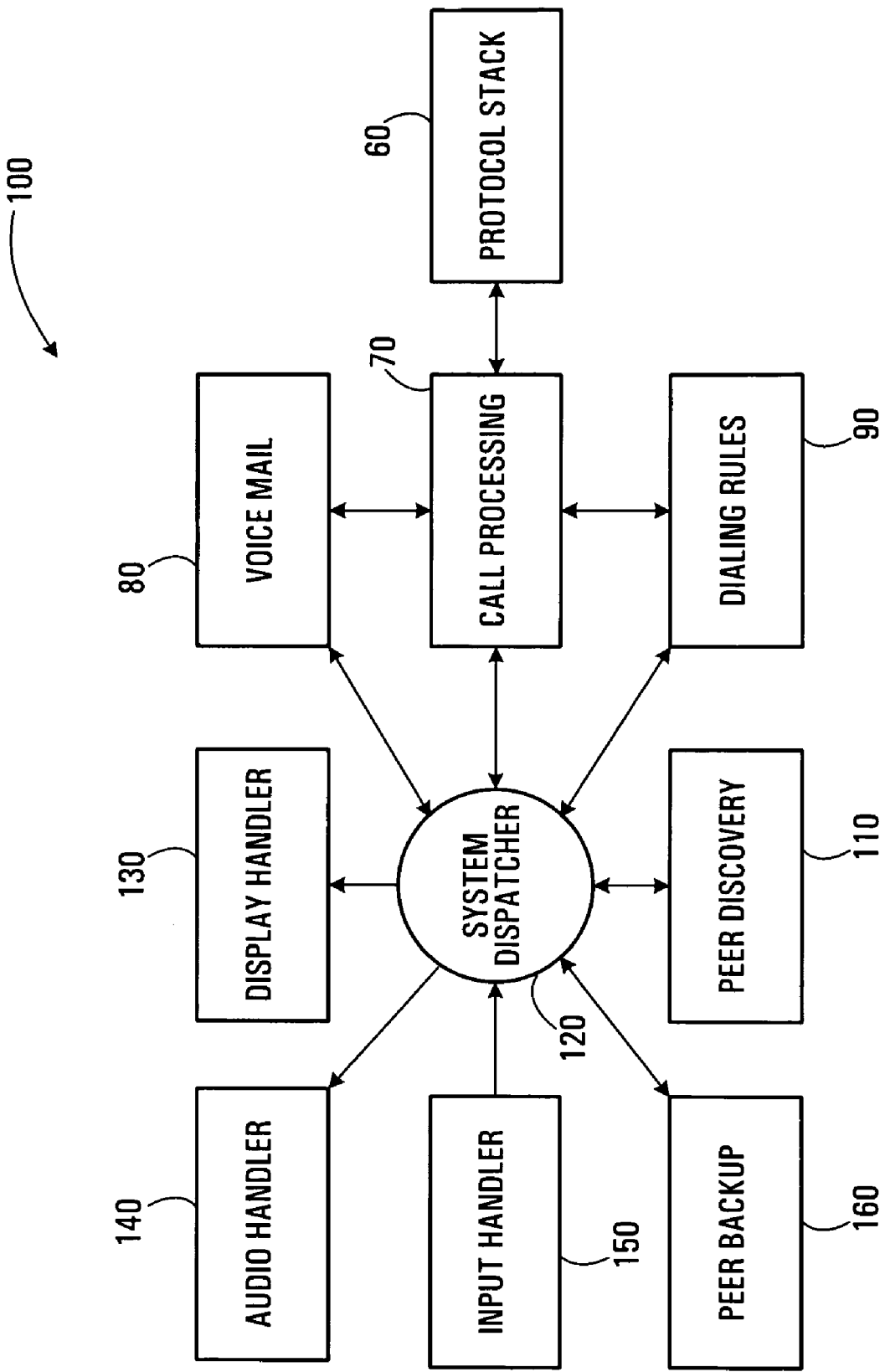
FIG. 3 is a functional block diagram of software operating on each terminal set of FIG. 1.

Referring to FIG. 3, shown is a functional block diagram of software operating on an exemplary terminal set 100-4. It will be understood that the same software operates on each terminal set 100-X of FIG. 1. The software is typically stored in RAM 535 of FIG. 2 and run on CPU 530, and may be loaded from a machine-readable medium 32 (FIG. 1) which could be a magnetic or optical disk, a tape, a chip, or another form of primary or secondary storage. More generally, the software can be implemented as any suitable combination of machine-executable code stored in memory for execution by general or special purpose processors, firmware, hardware, Application Specific Integrated Circuits (ASICs), Field-Programmable Gate Arrays (FPGAs), general or special purpose logic.

A system dispatcher 120 provides communication and scheduling between various functional elements which include a protocol stack 60, call processing module 70, a voice mail module 80, a dialing rules module 90, a peer discovery module 110, a display handler 130, an audio handler 140, an input handler 150, and a peer backup module 160.

Protocol stack 60 is a software implementation of a computer networking protocol (or set of protocols) that allows the terminal set to transmit and receive messages. Protocol stacks are well understood by those skilled in the art.

The call processing module 70 interacts with a protocol stack 60 to set up and tear down calls, and set up voice channels. When a call is received and a user is unable to answer the call, the call may be forwarded to voice mail or otherwise handled by virtue of operation of the module 70. The calls that are handled by module 70 may be calls that are destined for the current terminal set, or may be calls that are destined for another terminal set for which the current terminal set acts as backup in cases when the other terminal set is unavailable. The call processing modules 70 of a number of sets collectively serve to deliver PBX-like call processing capabilities in a distributed fashion without the need for centralized equipment. Call processing module 70 also has a call processing dispatcher (CP dispatcher) 71 which is responsible for managing the various call threads. The call processing module 70 will be described in more detail below.

Voice mail module 80 provides voice mail service when a call is received and a user is unable to answer the call.

The dialing rules module 90 contains and applies a set of dialing rules for the call-processing module 70 which control how calls are made.

The peer discovery module 110 facilitates peer discovery when a terminal set 100-X is initially connected to a network. Module 110 has a number of responsibilities. First, module 110 facilitates the automatic assignment of a unique DN to the current terminal set 100-X upon initial connection of the terminal set to a network. Second, module 110 ensures that the DN assigned to a terminal set 100-X is preserved even upon disconnection of the terminal set from the network 30 or upon loss of power of the terminal set (either of these resulting in a terminal set becoming "inactive"). The motivation for preserving the DN may be to prevent the DN of the inactive terminal set from being reassigned as a result of temporary disconnection of the terminal set from the network 30 (due to, e.g., a faulty connection between the terminal set and the network, a simple loss of power, or a wireless terminal set moving out of range), which reassignment could result in confusion on the part of a calling party as which terminal set has been called. Third, operation of module 110 at terminal set 100-X, in conjunction with operation at all of the other terminal sets in network 30, results in each terminal set being made aware of the DN of every other terminal set connected to the network 30, so that each terminal set is capable of making calls to other terminal sets. A brief overview of operation provided by the peer discovery module 110 follows.

Upon initial connection of a terminal set to a network in a "factory fresh" (i.e. as yet unconfigured) state, the terminal set notifies the other terminal sets on the network (its "peers") of its connection the network by way of a network connection notification. The network connection notification includes a unique identifier associated with the terminal set, such as a Media Access Control (MAC) address for example. As is known in the art, a MAC address is a unique hardware address or hardware number which serves as a unique identifier for a network device. The network connection notification may take the form of an "I_AM_HERE" message which is sent multiple times in order to increase the likelihood that the message will be received (at least in the case where no acknowledgement is sent by the other peers for each received message, as in the present embodiment).

The newly-connected terminal set also receives existence notifications from other terminal sets. An existence notification is an indication of a the existence a terminal set which either currently has a presence on the network (i.e. is active and connected to the network) or previously had a presence on the network (i.e. was previously active and connected but has now become disconnected and inactive). In the present embodiment, an existence notification may be any of an "I_AM_HERE" message (previously described), a "PEER_ASSERT" message (described below), or an "INACTIVE_PEER_ASSERT" message (described below). Each existence notification includes the unique identifier of the terminal set in respect of which the message was sent. The latter two types of messages ("PEER_ASSERT" and "INACTIVE_PEER_ASSERT" messages) additionally provide an indication of already claimed DNs and of the identity of the sending terminal set's primary backup and secondary backup, and are only received when the newly-connected terminal set is joining a network in which at least one terminal set has already claimed a DN.

From the existence messages, a list of all of the terminal sets on the network (referred to as a routing table), is created. The terminal sets in the list are sorted by their unique network device identifiers. For any terminal sets which have already claimed DNs, the claimed DN will be indicated in the sorted list. The newly-connected terminal set will have an ordinal position within the list.

To select a prospective DN, the newly-connected terminal set may add an offset associated with its ordinal position in the list to a base DN. For example, in a system where the DN represents a PBX extension, assuming that the new terminal set is fourth in a list of nine terminal sets, the prospective DN may be determined to be 204 (an offset equal to the terminal set's ordinal position, i.e. 4, plus a base DN of 200). By basing the selection of a prospective DN on the unique ordinal position associated with the terminal set, selection of unique prospective DNs by different terminal sets will be promoted. This assumes a scenario in which multiple factory-fresh terminal sets simultaneously join a network having no existing terminal sets with previously assigned DNs. The rationale is to try to prevent different terminal sets from initially selecting the same prospective DN, which may result in time-consuming conflict resolution processing.

Upon selecting its prospective DN, the newly-connected terminal set will then notify each other terminal set of its prospective DN. This is referred to as a "DN Probe". If no other terminal set objects to the claiming by the newly-connected terminal set of the prospective DN (with any objection possibly being based on an existing claim to that DN by one of the other terminal sets), the newly-connected terminal set claims the prospective DN as its own. The newly-connected terminal set may allow a pre-determined time interval to elapse before claiming its prospective DN, to provide sufficient time for the other terminal sets to raise any objections. Assuming that the prospective DN has been successfully claimed, the newly-connected terminal set notifies each other terminal set of its claim to that DN. The newly-connected set also stores the claimed DN in non-volatile memory, so that the assigned DN may be recalled if the terminal set loses power. The routing table may also be stored.

In the event that the newly-connected terminal set is joining an established network, the other terminal sets on the network may already have selected their DNs. In this case, it is possible that the prospective DN chosen by the newly-connected terminal set may already be assigned to one of the existing terminal sets. For example, if the ordinal position of the newly-connected terminal set within the sorted list of terminal sets is other than at the end of the list (e.g. if the unique identifier of the new terminal set places it somewhere in the middle of the sorted list), the prospective DN that will result when the offset associated with the ordinal position of the newly-connected terminal set is added to the base DN may represent the DN of one of the existing terminal sets.

In view of this possibility, before the newly-connected telephone attempts to notify any other terminal set of its prospective DN, it first consults its routing table to determine whether the prospective DN is already claimed by any other terminal sets in the network. If the prospective DN is already claimed by another set, the newly-connected DN may select another prospective DN, e.g. by adding an offset such as 1 to the largest DN found in the list, before notifying any of the other terminal sets of its choice. This may avoid unnecessary communications overhead on the network which might otherwise result if the newly-connected terminal set notifies each other terminal set of its prospective DN only to receive an objection from one of the other terminal sets which has already claimed that DN.

Once a newly-connected terminal set has successfully claimed a DN, the terminal set periodically notifies the other terminal sets on the network of its claim to that DN. In the present embodiment, each periodic notification takes the form of a "PEER_ASSERT" message which serves as a "heartbeat" of the newly-connected terminal set, indicating continued network presence and a continued claim to its DN. PEER_ASSERT messages also include an indication of the identity of the primary and secondary backup of the current terminal set (so that, if the identity of the current terminal set's backups changes, other terminal sets will be made aware of the change and will update their routing tables accordingly). The notifications are monitored by the other terminal sets on the network. In the present embodiment, the periodic notifications occurs at random time intervals (e.g. between 0 and 2 seconds). If a predetermined amount of time elapses without receipt of a notification from a terminal set, that terminal set is presumed to have become inactive. The periodic notification also serves to prevent a subsequently-added terminal set from attempting to claim that DN as its own. For example, if another terminal set has selected that DN as its prospective DN and is awaiting any objection from other terminal sets, the notification may serve as an objection to the claim of that DN by that terminal set. Express objections (e.g. DN_CONFLICT messages) may also be sent.

If a terminal set that has claimed a DN disconnects from the network or loses power, it will likely be incapable of periodically notifying the other terminal sets on the network of its claim to its DN. In this case, another terminal set in the network which has become aware of the unavailability of the disconnected terminal set (e.g. by the absence of any recent PEER_ASSERT messages from that terminal set) steps in and begins periodically notifying the other terminal sets on the network of the fact that, although the disconnected terminal set is inactive, its DN has already been claimed. The terminal set which has stepped in, which is referred to as a "surrogate" for convenience, is responsible for sending these periodic notifications (which take the form of "INACTIVE_PEER_ASSERT" messages, described below) in addition to periodically notifying the other terminal sets of its claim to its own DN. An algorithm may be applied to decide which terminal set should be the surrogate for an inactive terminal set. The surrogate's periodic notifications sent on behalf of the inactive terminal set may prevent a subsequently-added terminal set from attempting to claim the DN of the disconnected terminal set as its own.

If the disconnected terminal set later reconnects with the network, it may resume notifying the other terminal sets of its DN (which it may recall from its non-volatile memory) on its own behalf. When the surrogate terminal set detects the reconnection, it may cease notifying the other terminal sets of the reconnected terminal set's DN, since the reconnected terminal set has reassumed this responsibility.

Referring again to FIG. 3, the display handler 130 is responsible for formatting and displaying information to a user.

The audio handler 140 is adapted to play audio tones such as ringing, busy, call waiting tone or adapted to connect to a voice channel from the network to the handset speaker (or speaker phone) upon receipt of an audio message from the system dispatcher 120.

The input handler 150 is responsible for monitoring such functions as key press, hook switch, volume keys, hands free and mute button and for informing the system dispatcher 120 of appropriate actions to take.

Peer backup module 160 is generally responsible for selecting, and supporting the use of other, terminal sets as backup terminal sets for the current terminal set. Module 160 is also responsible for supporting the use of the current terminal set as a backup terminal set for other terminal sets. The operation of module 160 is described in greater detail below.

Figure 4:
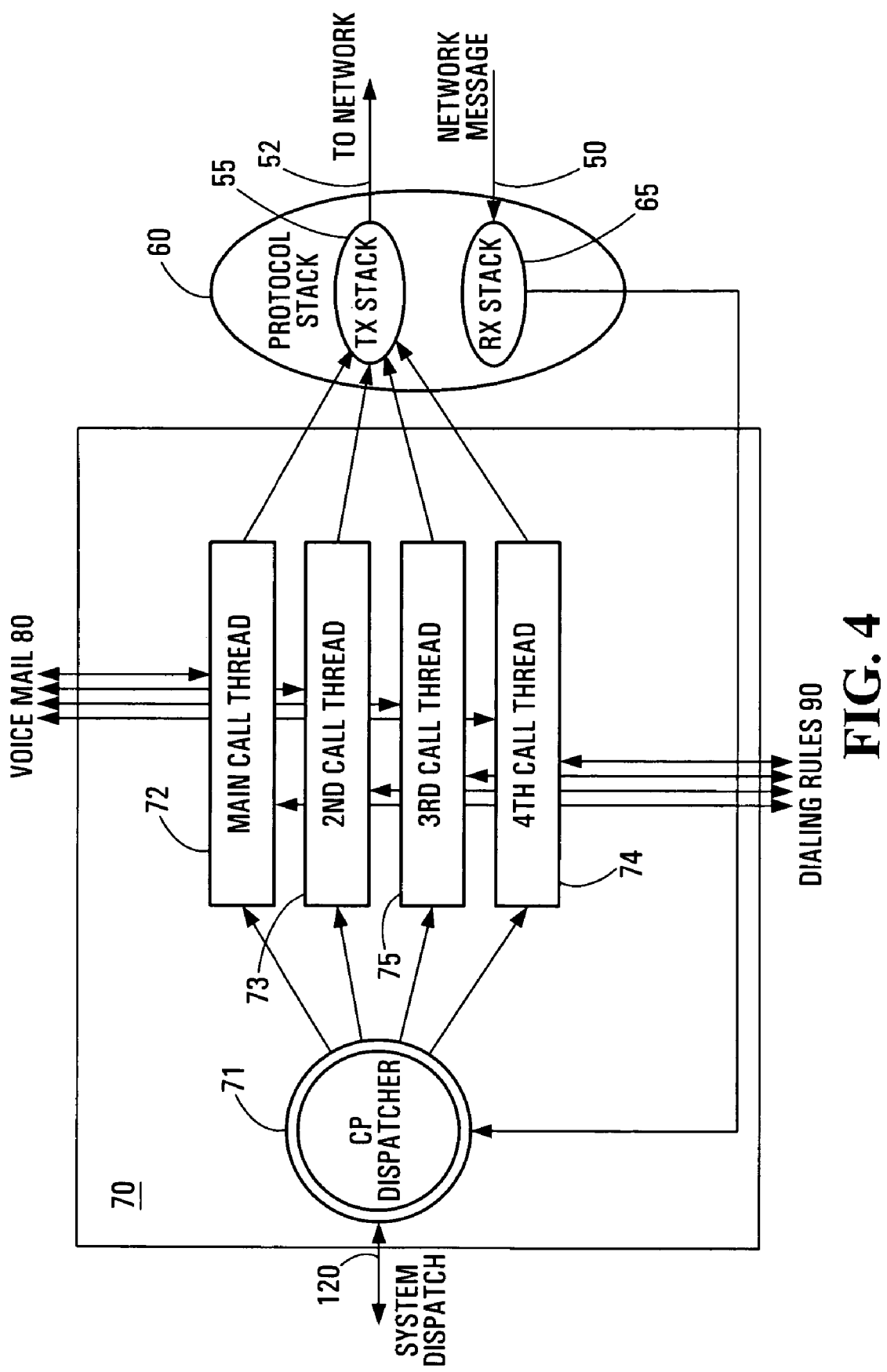
FIG. 4 is a functional block diagram of a peer-to-peer call processing module of FIG. 3.

FIG. 4 is a functional block diagram of the call processing module 70 of FIG. 2 together with the protocol stack 60. An incoming network message channel 50 is shown, this being any suitable mechanism for receiving messages over the network 30 to which the telephone is connected, and passing these to the protocol stack 60. Similarly, an outgoing message channel is shown at 52 which provides a path for generated messages to be sent over the network 30. In the embodiment of FIG. 4, there are four call threads 72, 73, 74, 75 to meet the needs of features being supported by a terminal set 100-X. Each call threads is capable of handling a respective call. For example, a voice call to the terminal may be processed with one call thread, while a voice mail message may be recorded simultaneously using another call thread. If should be appreciated that alternative embodiments may have a different number of call threads. Generally, at least two call threads should exist: one for a main line and another for voice mail. In the embodiment of FIG. 4, the three of the four call threads 72, 73, 74, 75 may be used to handle 3-way conferencing with the fourth acting as a spare for voice mail. The third call thread might be involved in recording a voice mail message being received by another terminal for which the particular terminal was designated as a backup.

When an incoming message arrives at the protocol stack 60 through channel 50, it is queued on a Receive (RX) stack 65 and ultimately sent to CP Dispatcher 71. The CP dispatcher 71 determines the thread for which the call is destined and forwards the message to an appropriate one of call threads 72, 73, 74 or 75. In response to the network message, the appropriate call thread responds by sending a response to the protocol stack 60 to be packaged and sent to its destination via a Transmit (TX) stack 55. The type of message to be sent back to the network depends on the state of the call thread. If, for example, the message is an INVITE message for a new call under Session Initiation Protocol (SIP) then the response is an appropriate acknowledgement such as a "180" RINGING message being returned or a "200" OK message when the call is answered.

FIG. 5 illustrates an exemplary routing table 200 maintained by an exemplary terminal set 100-X. In the steady state, each of the nine terminal sets of FIG. 1 will have an identical routing table 200 to that shown in FIG. 5. Routing table 200 is illustrated after peer discovery and peer backup selection have both been completed. By virtue of the completion of peer discovery, entries (i.e. rows) will exist for each terminal set on the network 30, and each terminal set will have claimed a unique DN. By virtue of the completion of peer backup selection (which is described in greater detail below), each peer will have been assigned a primary backup terminal set and a secondary backup terminal set.

For each terminal set or other network device having an entry in the routing table 200, the following information is maintained: DN (column 210), MAC address (column 220), IP address (column 230), Device type (column 250), first backup (column 260), type of first backup (column 265), second backup (column 270), type of second backup (column 275), terminal set state (column 296) and network class (column 299). Other information that is less relevant to peer backup (not shown) may also be maintained.

The DN (column 210) is analogous to a PBX extension of the terminal set. The MAC address (column 220) is a hardware address that uniquely identifies the terminal set. In the exemplary routing table 200 of FIG. 5, each MAC address is the same with the exception of the last two characters. The IP address (column 230) is the IP address of the terminal set, which address is used for VoIP messaging for example. Device type (column 250) is an indication of the type of network device. In the present example, the first nine entries in the routing table 200 represent VoIP-capable terminal sets. The last entry represents TTI 40. Various other types of network devices (e.g. gateways) may be included in routing table 200. First and second backups (columns 260 and 270) identify two terminal sets which have been assigned as backups to the terminal set represented by the row. Each backup is identified by MAC address DN being indicated in parentheses in columns 260 and 270 for purposes of aiding comprehension). The types of the first and second backups are indicated in columns 265 and 270 respectively. "Pri" indicates primary backup while "Sec" indicates secondary backup. Finally, class (column 299) indicates the network class (described above) of the network to which the terminal set represented by the row is connected, which is indicative of the reliability of the terminal set represented by the row.

Peer Backup Selection

When a terminal set 100-X initially connects to the network 30 in a factory-fresh state, the peer backup module 160 engages in peer backup selection. The objective of peer backup selection is to select a primary backup terminal set and a secondary backup terminal set which will assume the role of the current terminal set in the event that the current terminal set becomes unavailable. The result of peer backup selection is the population of the local routing table 200 (FIG. 5), as well as the routing tables 200 at other terminal sets, with backup information (in columns 260, 265, 270 and 275) that is sufficient to allow a calling terminal set to redirect its call to either a primary backup (when the master is unavailable) or a secondary backup (when both of the master and the primary backup are unavailable).

Figure 6:
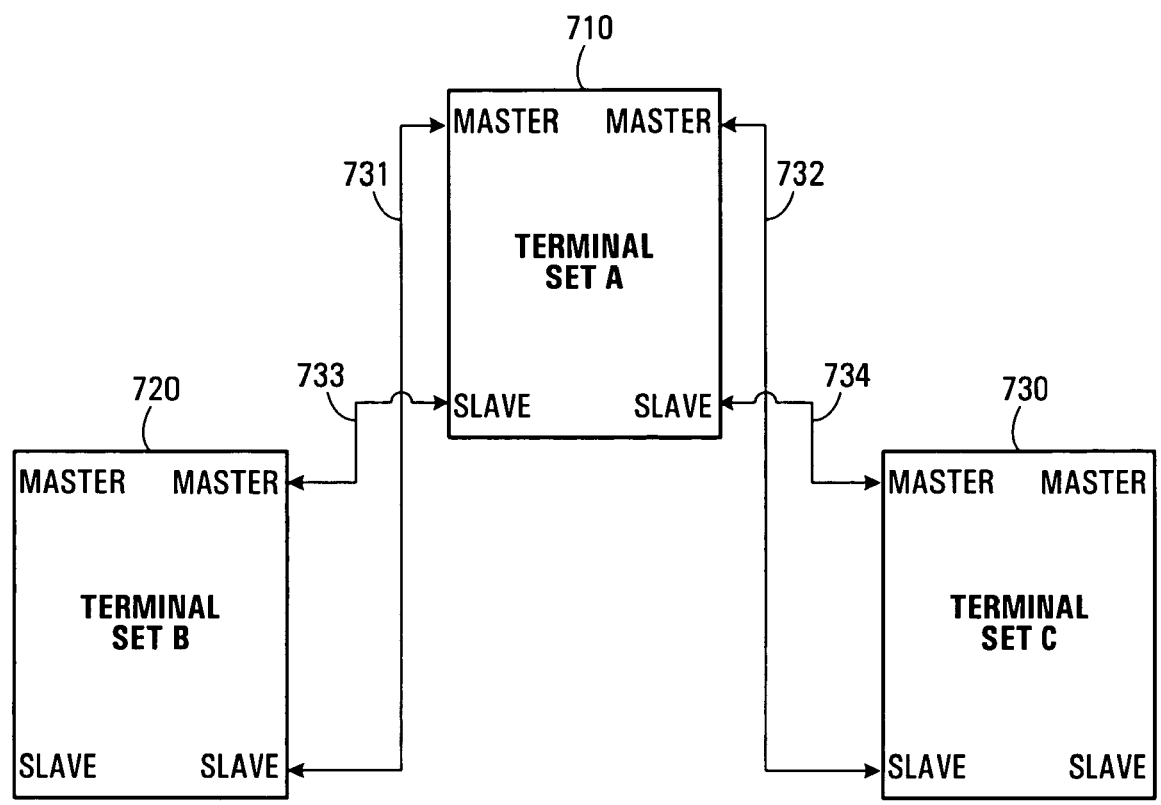
FIG. 6 is a block diagram of three terminal sets having master-slave relationships, according to an embodiment of the invention.

FIG. 6 is a notional block diagram illustrating the result of peer backup selection between three hypothetical terminal sets A, B and C. Each terminal set appears as a box in FIG. 6 having two master "ports" and two slave "ports". When a master port on a first terminal set is interconnected with a slave port on a second terminal set, this indicates that the second terminal set has been assigned as a slave (i.e. a backup) to the first terminal set. For example, interconnection 731 between terminal set A and terminal set B indicates that B is a backup for A (although B's status as a primary or secondary backup is not indicated in FIG. 6). Thus, interconnections 731, 732, 733 and 734 collectively indicate that terminal sets B and C have been assigned as A's backups; that terminal set A has been assigned as B's backup; and that terminal set A has also been assigned as C's backup. This demonstrates the fact that terminal sets may serve as each other's backups.

It will be appreciated that the ports and interconnections of FIG. 6 do not correspond to physical ports or interconnections. The notional interconnections 731, 732, 733, 734 are for illustration only, and are actually put into effect by other means, such as identifying the MAC addresses of sets A, B and C appropriately in backup columns 260 and/or 270 of routing table 200 (FIG. 5) at each the sets.

Figure 7:
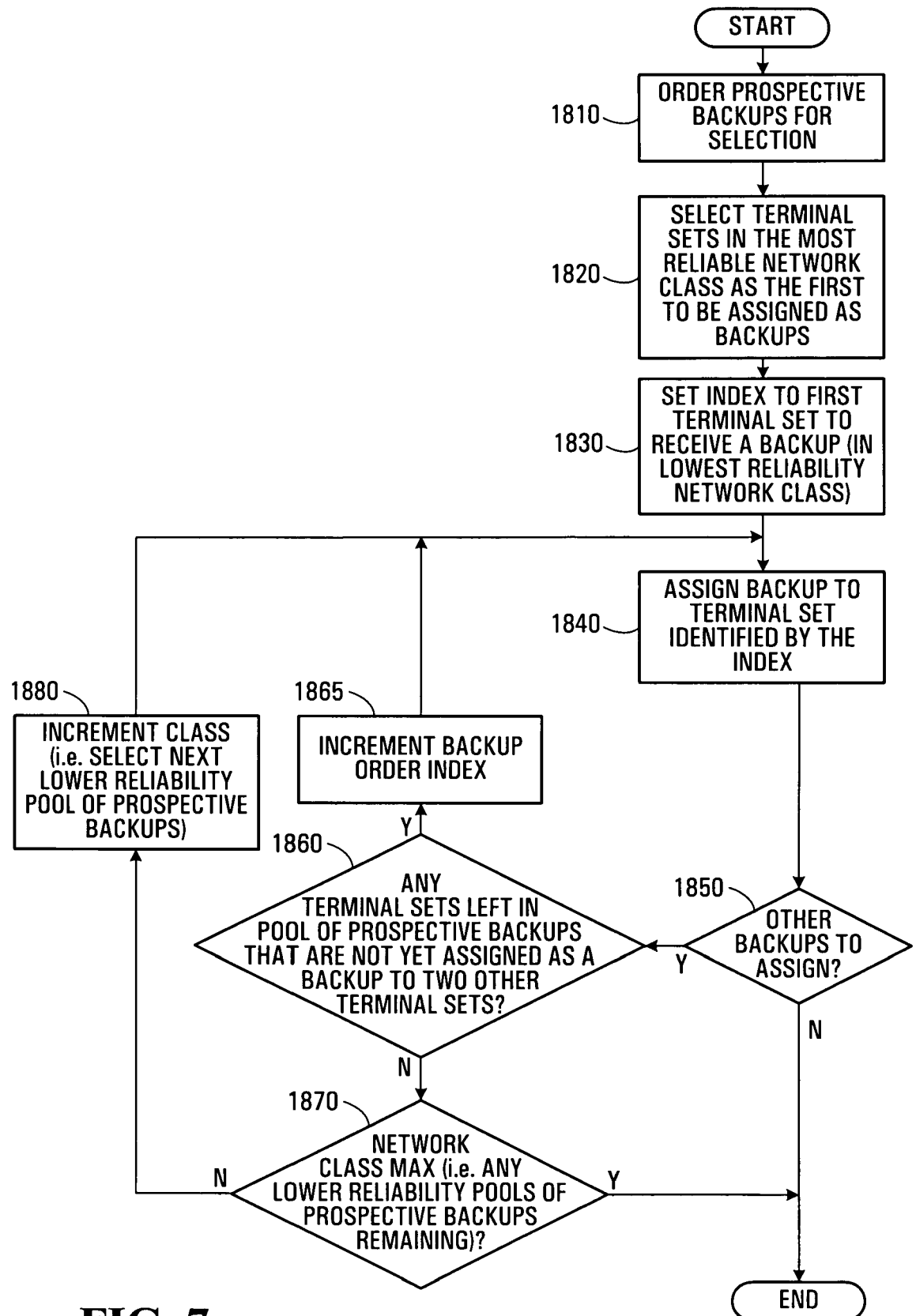
FIG. 7 is a flow chart of a method of selecting backup terminal sets, according to an embodiment of the invention.

FIG. 7 illustrates operation for selecting backup terminal sets according to an embodiment of the invention. As an illustrative example, backup selection for the terminal sets 100-1 to 100-9 of FIG. 1 will be described. Table 1 illustrates the network classes of each of the terminal sets 100-1 to 100-9 for which backup selection is to be performed.

TABLE 1 listing of DNs and class of network for a plurality of terminal sets.

| Terminal Set | DN | Network Class |
|---|---|---|
| 100-1 | 201 | 1 |
| 100-2 | 202 | 1 |
| 100-3 | 203 | 2 |
| 100-4 | 204 | 2 |
| 100-5 | 205 | 1 |
| 100-6 | 206 | 1 |
| 100-7 | 207 | 1 |
| 100-8 | 208 | 1 |
| 100-9 | 209 | 1 |

As shown in Table 1, the terminal sets 100-1, 100-2, and 100-5 to 100-9 are connected to a class 1 (sub-)network 18 while terminal sets 100-3 and 100-4 are connected to a class 2 (sub-)network 16 (FIG. 1).

Referring to FIG. 7, initially prospective backups (i.e. all of the terminal sets 100-1 to 100-9) are ordered for selection as backup terminal sets (1810). This ordering is shown in Table 2 below. Referring to Table 2, in the present embodiment the prospective backups are ordered by (1) network class (by decreasing class reliability) and (2) backup type (by decreasing backup priority, i.e., primary before secondary). Because of the operative backup scheme in which each prospective backup will serve as both a primary backup and as a secondary backup in the present embodiment, for purposes of ordering, each prospective backup is listed twice: once as a primary backup and once as a secondary backup. Each unique combination of network class and backup type constitutes a "group". In the present embodiment, because there are two network classes and because each terminal set serves both as a primary backup and as a secondary backup, four groups exist. These four groups are identified as groups 1-4 in Table 2.

TABLE 2 list of prospective terminal sets ordered for backup selection by network class and backup type

| Ordinal # | Network Class | Backup Type | Terminal Set | Group # |
|---|---|---|---|---|
| 1 | 2 | P | 100-3 | 1 |
| 2 | 2 | P | 100-4 | |
| 3 | 1 | P | 100-1 | 2 |
| 4 | 1 | P | 100-2 | |
| 5 | 1 | P | 100-5 | |
| 6 | 1 | P | 100-7 | |

TABLE 2-continued list of prospective terminal sets ordered for backup selection by network class and backup type

| Ordinal # | Network Class | Backup Type | Terminal Set | Group # |
|---|---|---|---|---|
| 7 | 1 | P | 100-6 | |
| 8 | 1 | P | 100-8 | |
| 9 | 1 | P | 100-9 | |
| 10 | 2 | S | 100-3 | 3 |
| 11 | 2 | S | 100-4 | |
| 12 | 1 | S | 100-1 | 4 |
| 13 | 1 | S | 100-2 | |
| 14 | 1 | S | 100-5 | |
| 15 | 1 | S | 100-7 | |
| 16 | 1 | S | 100-6 | |
| 17 | 1 | S | 100-8 | |
| 18 | 1 | S | 100-9 | |

Put another way, the terminal sets are placed into M "pools" of prospective backups, where each pool contains terminal sets of a particular reliability (i.e. network class). Here, because two reliability levels exist (i.e. class 1 and class 2)—this is because M=2—two pools are created: a first pool (sets 100-3 and 100-4) and a second pool (sets 100-1, 100-2, and 100-5 to 100-9). The first and second pools correspond to groups 1 and 2 of Table 2. Groups 3 and 4 are merely a replication of groups 1 and 2 representing the same terminal sets in their capacity as prospective secondary, versus prospective primary, backups.

As shown in Table 2, the terminal sets in ordinal positions 1 to 9 (groups 1 and 2) comprise all of the terminal sets in the system listed in their capacity as prospective primary (P) backup terminal sets. The terminal sets in ordinal positions 10 to 18 (groups 3 and 4) are the same set of terminal sets as those listed in ordinal positions 1-9 (in the same order) in their capacity as prospective secondary (S) backup terminal sets.

Within each of groups 1, 2, 3, and 4, the terminal sets are ordered according to their MAC addresses (not shown). For example, at ordinal positions 6 and 7 of Table 2, the terminal set having DN 207 has a lower MAC address than the terminal set having DN 206, and thus is ordered to be selected before the terminal set having DN 206. This basis for ordering within groups is not crucial to operation of the present embodiment, and may differ in alternative embodiments.

Next, the set of terminal sets in the most reliable network class (here, those on the class 1 network, i.e., terminal sets 100-1, 100-2 and 100-5 to 100-9) are chosen as the first pool of terminal sets which will be assigned as primary backups (1820). This choice reflects an initial preference for high-reliability backups.

Subsequently, an index is set to the ordinal number of the first terminal set from the ordered set of terminal sets (Table 2), which represents the first terminal set to receive a backup, or, put another way, the first assignee (1830). The terminal set identified at 1830 will be a terminal set in the least reliable network class, and more specifically, will be the terminal set with the lowest MAC address of all terminal sets in the least reliable network class. The fact that the lowest reliability network class is initially chosen reflects a backup assignment strategy whereby terminal sets on the least reliable networks are the first to receive backups. The "lowest MAC number" criterion is simply a secondary ordering scheme, and is of lesser importance. As will be seen, the first backup that will be assigned to the first recipient identified in 1820 will be from the most reliable network class. The rationale for this approach is that terminal sets on networks of the lowest reliability should receive as their backups those terminal sets that are in network classes of the highest reliability.

At 1840, the first terminal set to be assigned as a backup (i.e. terminal set 100-1) is assigned as a primary (or "first level") backup to the terminal set at the current ordinal position of Table 2 (i.e. terminal set 100-3), as identified by the setting of the index in 1830. Thus, in this first iteration, the terminal set with the lowest MAC address of any terminal set in network class 1 (terminal set 100-1) is assigned as a primary backup for the terminal set having the lowest MAC address from the least reliable network class (terminal set 100-3).

Next, an assessment is made as to whether there are other backups to assign (i.e. a query is made as to whether any terminal set has not yet been assigned as both a primary backup and secondary backup) (1850). If there are no backups left to assign (i.e. if all the backups have been assigned as both primary and secondary backups), then peer selection ends. If any terminal sets remain (in any pool) which have not been assigned as both a primary and secondary backup, however, then an assessment is made as to whether there are any terminal sets left in the current network class (i.e. the current pool) of prospective backups which have not yet been assigned as a backup to two terminal sets (1860).

If the assessment at 1860 is made in the positive, then the index representative of the ordinal position within Table 2 of the next backup recipient (i.e. next assignee) is incremented (1865) and operation returns to step 1840 to assign the next backup.

If, on the other hand, the assessment at 1860 is made in the negative (i.e. all the terminal sets of the current network class/current pool have been assigned as a backup to two terminal sets), a further assessment is made as to whether any terminal sets having a less reliable network class exist (i.e. whether any lower reliability pools of prospective backups exist)(1870). If the latter assessment is made in the positive, then the network class is incremented (i.e. set to the next, class number of lower reliability) at 1880 before returning to 1840 to repeat the process for the new network class. If, on the other hand, the assessment of 1870 is made in the negative, then each terminal set will have received its two backups, and the selection ends.

For clarity, the "Yes" branch of 1870 would typically be followed when backup selection is completed for a group of "factory fresh" sets. In contrast, the "No" branch of 1850 may be followed when a new terminal set joins an existing group of terminal sets.

At the conclusion of backup assignment, the backup terminal set assignments will be as illustrated in Table 3.

TABLE 3 list of backup terminal sets and the terminal sets for which they act as backups

| Terminal set | Network class | Terminal set and type of backup | Terminal set and type of backup |
|---|---|---|---|
| 100-1 | 1 | 100-3(P) | 100-8(P) |
| 100-2 | 1 | 100-4(P) | 100-9(P) |
| 100-5 | 1 | 100-1(P) | 100-3(S) |
| 100-6 | 1 | 100-2(P) | 100-4(S) |
| 100-7 | 1 | 100-5(P) | 100-1(S) |
| 100-8 | 1 | 100-7(P) | 100-2(S) |
| 100-9 | 1 | 100-6(P) | 100-5(S) |
| 100-3 | 2 | 100-7(S) | 100-8(S) |
| 100-4 | 2 | 100-6(S) | 100-9(S) |

In Table 3, the first column identifies the backup terminal set, the second column specifies the network class of the backup set, the third column identifies the first terminal set for which the set identified in column 1 acts as a backup (with the type of backup being identified in parentheses), and the fourth column identifies the second terminal set for which the set identified in column 1 acts as a backup (with the type of backup again being identified in parentheses).

The backup assignment information of Table 3 is populated into the routing table 200 (FIG. 5) of each of the terminal sets in the system, and more particularly, into columns 260, 265, 270, and 275 of the routing table 200. Backup assignment information is propagated via the PEER_ASSERT messages periodically transmitted by each device. In the result, the routing table 200 at each terminal set will appear as shown in FIG. 5.

As shown in Table 3, a backup terminal set may serve as a primary backup for two different terminal sets, as a primary backup for one terminal set and a secondary backup for another terminal set, or as a secondary backup for two different terminal sets. For example, referring to the first row of Table 3, it can be seen that the terminal set 100-1 is a primary backup terminal set for the terminal set 100-3 and is also a primary backup terminal set for the terminal set 100-8. Referring to the seventh row of Table 3, the terminal set 100-9 serves as a primary backup for the terminal set 100-6 and as a secondary backup for the terminal set 100-5. Finally, as shown in the last row of Table 3, the terminal set 100-4 serves a secondary backup terminal set for the terminal set 100-6 and also as a secondary backup terminal set for the terminal set 100-9. It is noted, however, that a backup will not serve as both a primary backup and a secondary backup to the same master.

The backup selection illustrated in FIG. 7 allows terminal sets in the less reliable (class 2) network to have backup terminal sets in the more reliable (class 1) network, so that the terminal sets of the less reliable network (i.e. sub-network 16) can have backup functionality on the more reliable network (i.e. sub-network 18) even if the less reliable network has become inaccessible to callers from the PSTN, e.g. due to failure of intranet 14.

In some embodiments, the terminal sets requiring backups will all have the same network class. In such cases, the terminal sets could be ordered for example using the MAC addresses only. Furthermore, embodiments of the invention are not limited to ordering terminal sets using a MAC address as an identifier (e.g. as in Table 2). Other identifiers such as IP addresses, DNs, and serial numbers for example, could be used.

Figure 8:
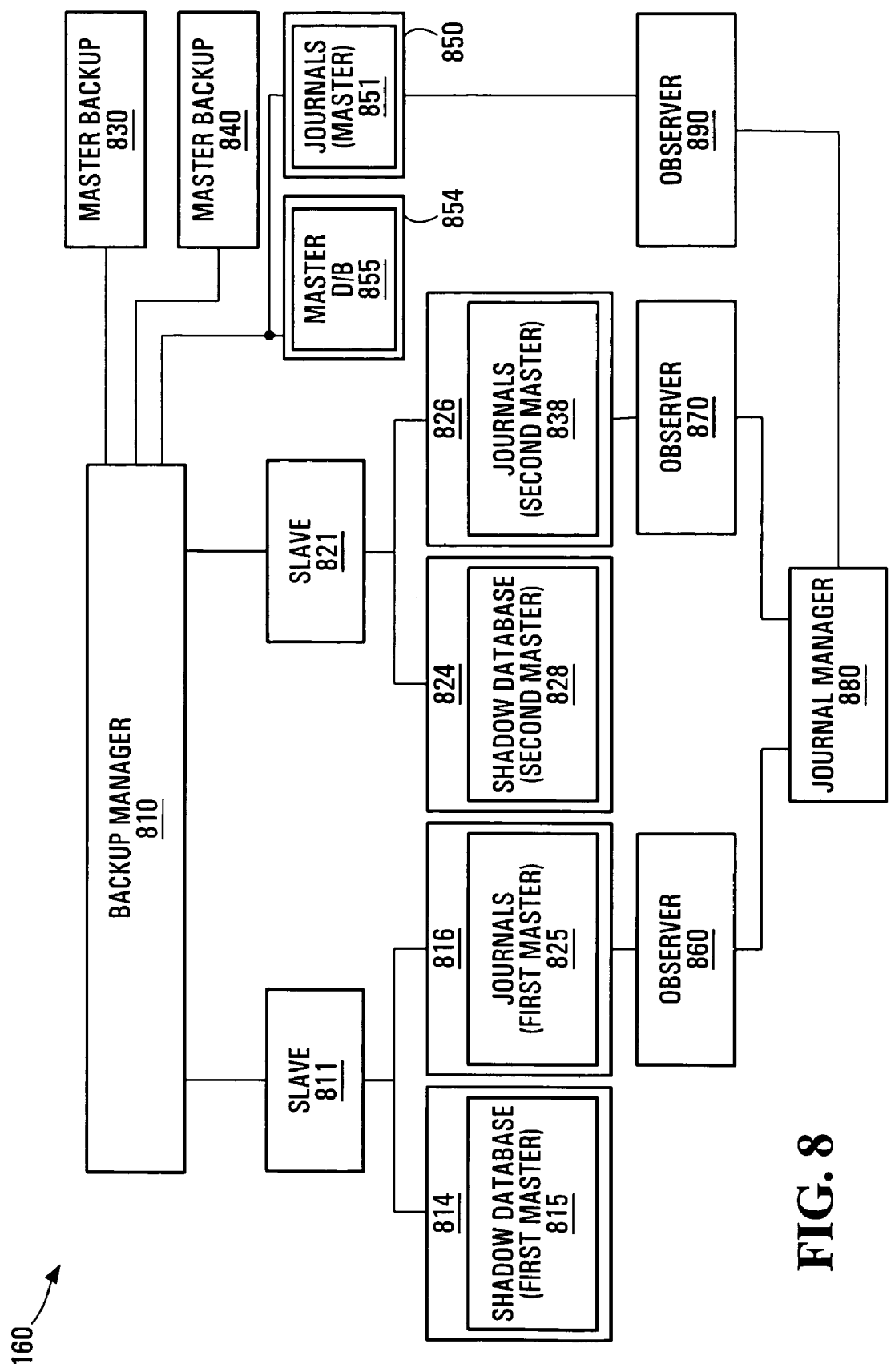
FIG. 8 is a functional block diagram of software operating as part of terminal sets of FIG. 3 for peer backup.

FIG. 8 is a functional block diagram illustrating the structure of peer backup module 160 of FIG. 3 in greater detail. The peer backup module 160 at each terminal set 100-X is the same. As an illustrative example, the operation of the peer backup module 160 is described from the perspective of hypothetical terminal set A of FIG. 6.

Backup manager 810 is responsible for determining which terminal sets will be the primary and secondary backups for the current terminal set A and for taking necessary actions for the current set A to become a master to those backups. Backup manager 810 manages and coordinates functions for a first master backup module 830 and a second master backup module 840 which assist it with its objective.

Journal Manager 890 is responsible for synchronizing the master database 855 (containing data relevant to the settings of current terminal set A) with "shadow" databases maintained by each of terminal set A's slaves (i.e. terminal sets B and C, which are not illustrated, but have their own instances of peer backup module 160). Shadow databases are copies of a master terminal set's database maintained by slaves for purposes of emulating the master should the master become unavailable. Journal Manager 890 is also responsible for synchronizing a pair of shadow database 815 and 828 maintained by the current terminal set A representing copies of the databases of each master terminal set for which A acts as a slave (i.e. copies of the master database of terminal sets B and C). Blocks 854, 814 and 824 represent database modules by which databases 855, 815 and 828 respectively are accessed.

The remaining blocks of FIG. 8 pertain either to the role of terminal set A as a master terminal set or its role as a slave to terminal sets B and C. These will be described in turn.

Blocks Pertaining to Terminal Set A as Master Terminal Set

Master backup module 830 is a thread which governs master-side interaction of the current terminal set A with another terminal set for purposes of establishing a first slave for terminal set A (e.g. terminal set B) or removing that slave. Operation of module 830 is described in greater detail below. Master backup module 840 is analogous to module 830 except that it governs master-side interaction for purposes of establishing a second slave for terminal set A (e.g. terminal set C) or removing that slave.

Local journal module 850 provides access to local journal 851. Local journal 851 represents a set of changes which have recently occurred to the master database 855 (i.e. recent changes to the configuration of the current terminal set A). Such changes are tracked for purposes of reporting to slave terminal sets B and C.

Observer 890 is responsible monitoring the local journal 851 for changes and for indicating to the journal manager 880 that a change has been detected, so that journal manager 880 may coordinate propagation of the changes to slave terminal sets B and C. The journal manager 880 may for example periodically verify with the observer module 890 whether there are changes to report and if there are changes to report, reports the changes to the backup terminal sets B and C by way of messages sent on network 30 (FIG. 1).

Blocks Pertaining to Terminal Set A as Slave Terminal Set

Slave module 811 is a thread which governs slave-side interaction of the current terminal set A with another terminal set for purposes of establishing terminal set A as a slave (either primary or secondary) for the other terminal set (e.g. terminal set B) or being removed as a slave. Operation of slave module 811 is described in greater detail below. Secondary slave module 821 is analogous to module 811 except that it governs slave-side interaction for purposes of establishing terminal set A as a slave (either primary or secondary) for another terminal set (e.g. terminal set C) or being removed as a slave.

Shadow databases 815 and 828 represent copies of the databases of each master terminal set for which A acts as a slave (i.e. copies of the master databases of terminal sets B and C). The first database 815 is used by terminal set A to allow it to emulate terminal set B should the latter become unavailable (for purposes of this example, it is assumed that terminal set A is a primary slave for terminal set B). Examples of information stored in the backup database 815 may include user options and speed dial settings of terminal set B for example. The second database 828 is analogous to database 815 but is used to emulate terminal set C, if necessary (which in this example is presumed to have selected terminal set A as its secondary backup).

In the event that the terminal set A has assumed the role of the (unavailable) master terminal set B (i.e. has become "activated" as a backup), observer module 860 is responsible monitoring the local journal 825 via module 816 for changes representing changes to the unavailable master's shadow database 815 and for indicating to the journal manager 880 that a change has been detected. If a change is detected, journal manager 880 coordinates propagation of the change to any other slaves which may exist for the same unavailable master. The identity of other slaves may be obtained through examination of the local routing table 200 (FIG. 5) for example. Journal manager 880 also coordinates propagation of the change to the master terminal set B after it has once again become available.

In FIG. 8, only one database and one journal are shown for each of the master and the two slaves. However, it is to be understood that in some embodiments of the invention there are a plurality of databases and journals for each of the master and slaves.

Modules 821, 824, 826, 828, 838 and 870 are analogous to modules 811, 814, 816, 815, 825, and 860 (respectively), except they pertain to the other master terminal set for which terminal set A acts as backup (i.e. terminal set C).

The journal manager 880 periodically verifies with the observer modules 860, 870 whether there are changes to report and if there are changes to report, reports the changes to the appropriate master terminal set B or C 730.

If a new terminal set 100-10 set having a DN 210 were connected to the sub-network 16 of the system 10 (FIG. 1), it would be desirable for the new terminal set to be provided with primary and secondary backup terminal sets. However, assuming the steady state condition for terminal sets 100-1 to 100-9, no terminal sets will be available to serve as backups for the new terminal set. In particular, no terminal sets within the more reliable sub-network 18 (which are preferable as backups due to their superior reliability) will be available to serve as a backup for the new terminal set.

In this case, the new terminal set 100-10 may examine column 270 of the routing table 200 (which it will construct upon its connection to the network through peer discovery operation) to determine whether any terminal sets presently acting as secondary backups are in network class 1 (i.e. are most reliable). Assuming its routing table 200 reflects the information shown in exemplary routing table 200 of FIG. 5, this examination may reveal that, e.g., terminal sets 100-8 and 100-9 fall into this category.

In this case, the new terminal set may send a pre-empt message to the master terminal sets which currently have terminal sets 100-8 and 100-9 as its backups (e.g. to terminal sets 100-2 and 100-5 respectively) requesting each of the master terminal sets to surrender its secondary backup. Thereafter, the new terminal set 100-10 may send a message to terminal set 100-8 requesting it to become the primary backup for terminal set 100-10. Similarly, the new terminal set 100-10 may send a message to terminal set 100-9 requesting it to become the secondary backup for terminal set 100-10.

Subsequently, terminal sets 100-2 and 100-5, which have each lost their secondary backup as a result of the pre-emption, may each send a message to the new terminal 100-10 requesting it to become its secondary backup.

Figure 9:
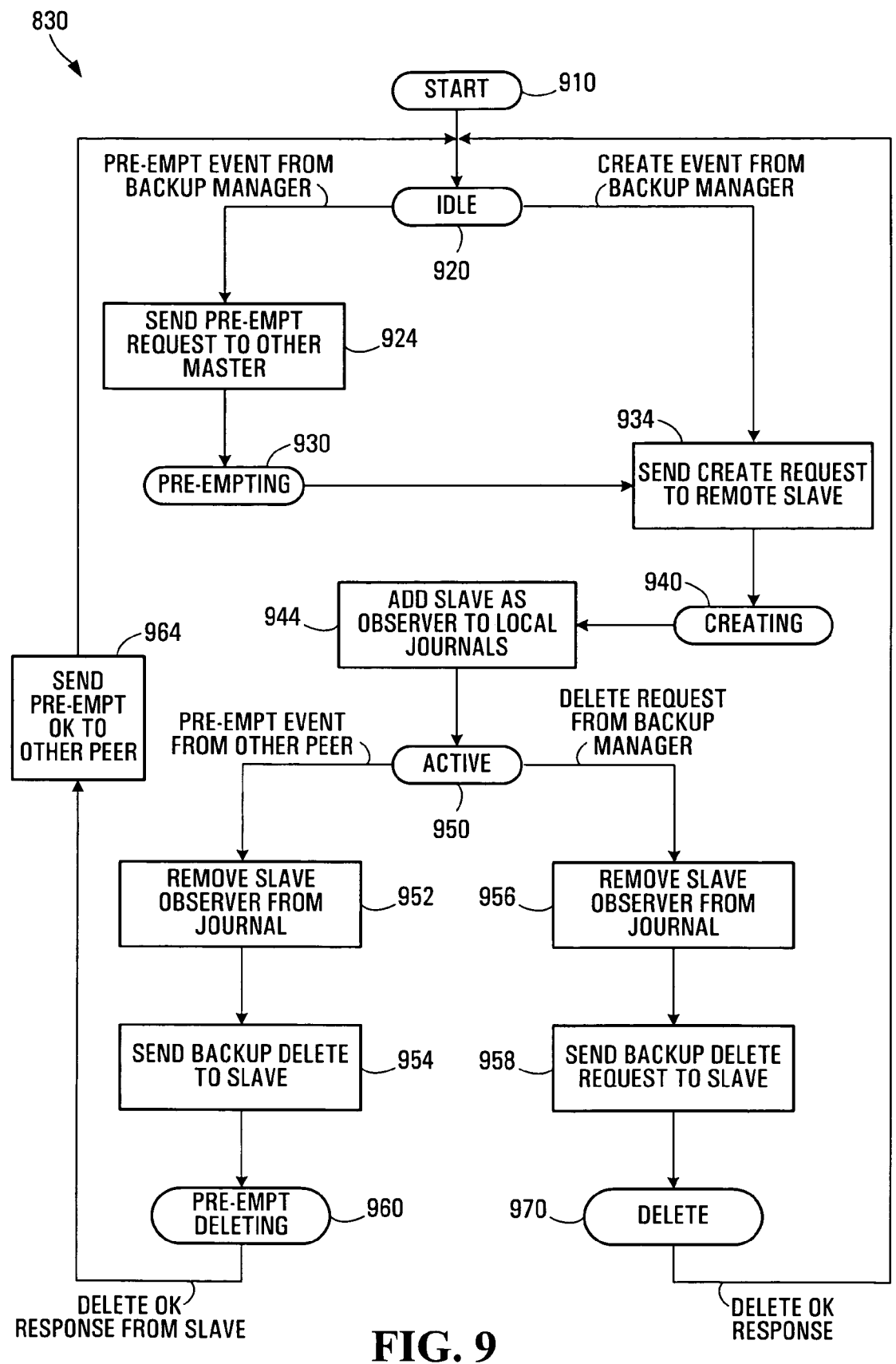
FIG. 9 is a state machine/flow chart governing operation of a master terminal set in assigning, deassigning and preempting backups.

FIG. 9 illustrates master backup module 830 of FIG. 8 in greater detail. It will be appreciated that master backup module 830 constitutes a state machine which governs operation of a master terminal set for assigning, de-assigning and pre-empting a single backup terminal set. Thus, in the present embodiment where each terminal set has a primary and a secondary backup, a second instance of a master backup module (i.e. module 840 of FIG. 8) will also exist for purposes of assigning, de-assigning and preempting a second backup terminal set. It will be appreciated that the state machine shown in FIG. 9 incorporates steps which are akin to flow-chart steps between states, thus FIG. 9 may be considered a form of flowchart and/or a state machine. The state machine will be described with reference to operation by terminal set A in its capacity as a master terminal set.

Initially terminal set A enters an Idle state 920 in which it has no backup assigned. Upon instruction from the backup manager 810 to add a backup (which may occur after the backup manager 810 examines its slave relationships following boot-up, following addition of a new terminal set to the network 30, following removal of an existing terminal set from the network 30, or following a return to availability of an existing terminal set), a Create Request message is sent to a prospective terminal set (934) to request it to assume the role of backup for terminal set A. Terminal set A then waits for a positive Creating Response message from the prospective backup terminal set associated with a "creating" state 940, which reflects a willingness of the prospective backup to assume the role of backup for terminal set A. Upon receipt of the positive Creating Response message from the backup terminal set, the backup terminal set is added as an observer to a locals journals maintained by the local journal module 850 (944). That is, the Creating Response message arrives at block 810 and is routed to block 830 or 840 (whichever is managing the relationship with this particular slave) for processing. The slave terminal becomes an observer (890) to the Master's database (855) and is maintained by local Journal module (850). This means that the slave will now be notified of changes to the local database. Terminal set A then enters an Active state 950 in which a backup has now been assigned.

If there are no terminal sets available as backup terminal sets, a pre-empt event is initiated by the backup manager 810 for purposes of triggering operation which causes another terminal set to relinquish one of its backups. In this case, the current terminal set (set A) send a pre-empt message to another master terminal set (924) (which may be identified as having a secondary backup of the highest reliability, as described above) to surrender one of its backups. Terminal set A then waits for a positive Pre-empt Response from the other master terminal set (at 930) indicating that a backup terminal set has been relinquished.

Thereafter, terminal set A proceed with operation beginning at 934 as described above, resulting in a transition to the Active state 950, at which the surrendered backup has been assigned to the current terminal set.

At state 950, if the backup manager 810 initiates de-assigning of the assigned backup terminal set from the master terminal set, for example because the master terminal set is to be removed from the network, the backup terminal set is removed as an observer of the journals maintained by the local journal module 850 (956). In this scenario, Backup Manager 810 would inform Backup Master 830 that the local terminal set is being removed from the network. The Backup Master 830 would then send the Delete Request to the slave. Upon receipt of the Delete Response, the observer entry 890 of the master database 855 would be removed, and no longer monitored by local Journal module 850. The master terminal set A then sends a backup delete request to the backup instructing the backup that it is no longer required as a backup for terminal set A (958). Terminal set A then waits for a positive Delete Response indicating that the backup terminal set has removed all references to terminal set A as master from its routing table 200 (970) before returning to the idle state 920.

Alternatively, from state 950, if a pre-empt request is received from another terminal set requesting that the terminal set A relinquish one of its backups, the backup manager 810 initiates a Delete Request event to remove its backup B as an observer of the journals maintained by local journal module 850 (952). The backup manager 810 would route the pre-empt request to Backup Master 830 for processing. That is, master backup module 830 would then initiate a Delete Request to the slave. Upon receipt of the Delete Response, the observer entry 890 of the Master database 854 would be removed, and no longer monitored by local Journal module 850. Terminal set A then sends a backup delete request to backup B indicating to backup B that it is being pre-empted (954). Terminal set A then waits for a positive Delete Response indicating that the backup terminal set B has removed all references to set A as a master terminal set (state 960). Upon receipt of the positive Delete Response from backup B, terminal set A sends a positive Pre-empt Response to the terminal set that initiated the pre-empt event (step 964). Terminal set A then returns to the idle state 920.

Figure 10:
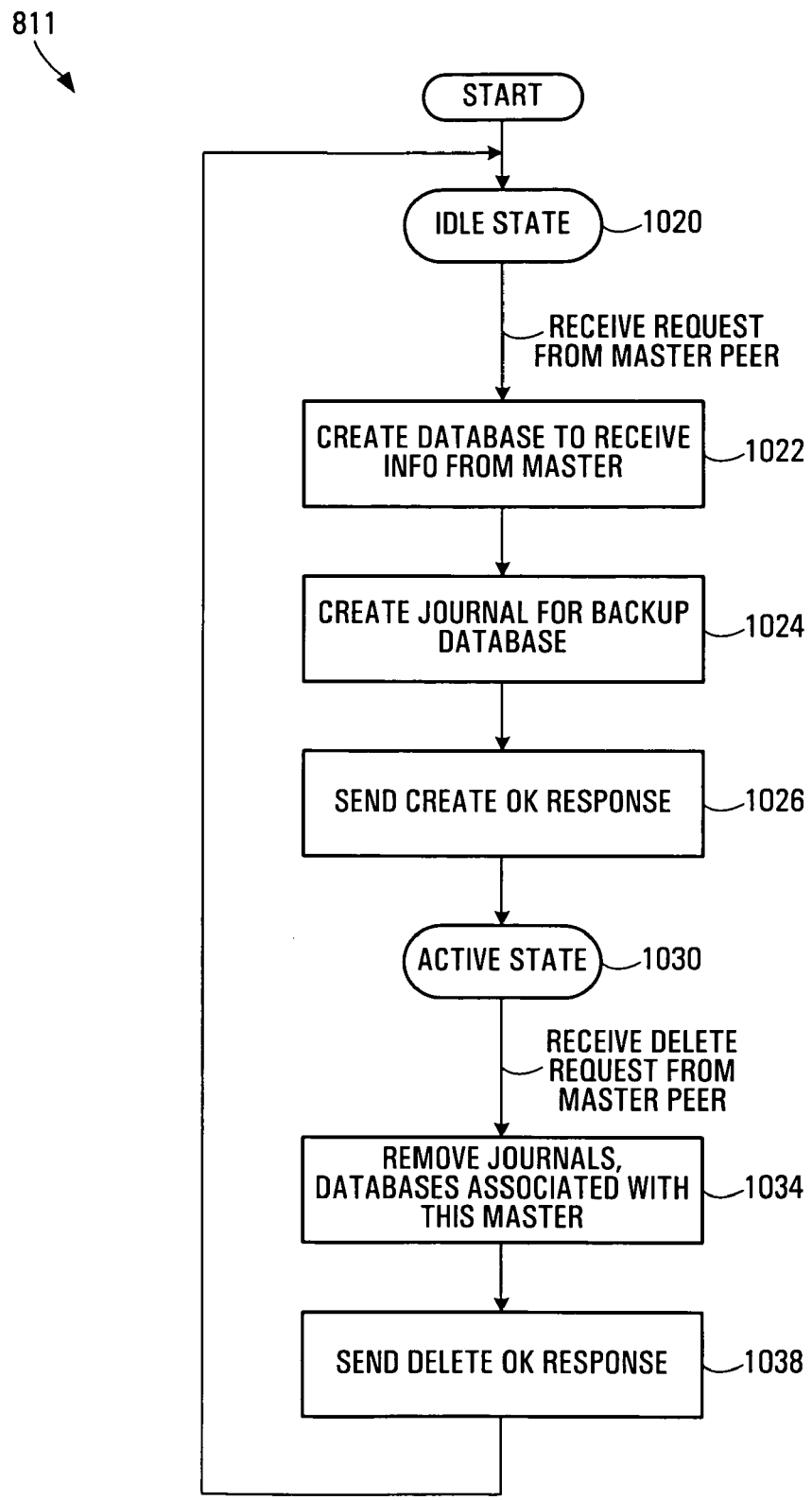
FIG. 10 is a state machine/flow chart governing operation of a terminal set to effect its assignment and deassignment as a backup.

FIG. 10 illustrates slave module 811 of FIG. 8 in greater detail. It will be appreciated that slave module 811 constitutes a state machine which governs slave-side operation of terminal set A to effect its assignment and de-assignment as a backup to a first master. A second instance of a slave module (i.e. module 821 of FIG. 8) also exists for purposes of assignment and de-assignment of terminal set A as a backup to a second master. It will be appreciated that the module 811 of FIG. 10 incorporates steps which are akin to flowchart steps between state machine states, thus FIG. 10 may be considered a form of flowchart and/or a state machine. FIG. 10 will be described from the perspective of terminal set A being assigned and de-assigned as a backup to terminal set B.

Initially, module 811 is in Idle state 1020 which represents terminal set A not yet being assigned as a backup. When terminal set B desires terminal set A as its backup, it sends a Create Request message to terminal set A. Upon receipt of the Create Request message at terminal set A, the backup manager 810 at terminal set A initiates the process of creating a shadow database 815 (1022) to receive information from the prospective master terminal set B for use by terminal set A in assuming the role of set B upon unavailability of set B. The backup manager 810 also initiates the process of creating the journal 825 for the backup database 815 (1024) for use in tracking any changes to the unavailable master's shadow database 815. Terminal set A then responds to terminal set B with a Create Response OK message indicating that the request has been implemented (1026) and enters an Active state 1030 in which has been assigned as a backup for the master terminal set B.

If the master terminal set B later wishes to remove terminal set A as its backup, it sends a Delete Request to terminal set A. Upon receipt of a delete request from terminal set B, the backup manager 810 at terminal set A initiates removal of the backup database 815 and the journal 825 which were created at 1022 and 1024 respectively (1034). Terminal set A then sends a Delete OK response to the master terminal set B indicating that the delete request was successful (1038) before returning to the idle state 1020, in which it has been de-assigned as backup.

Figure 11:
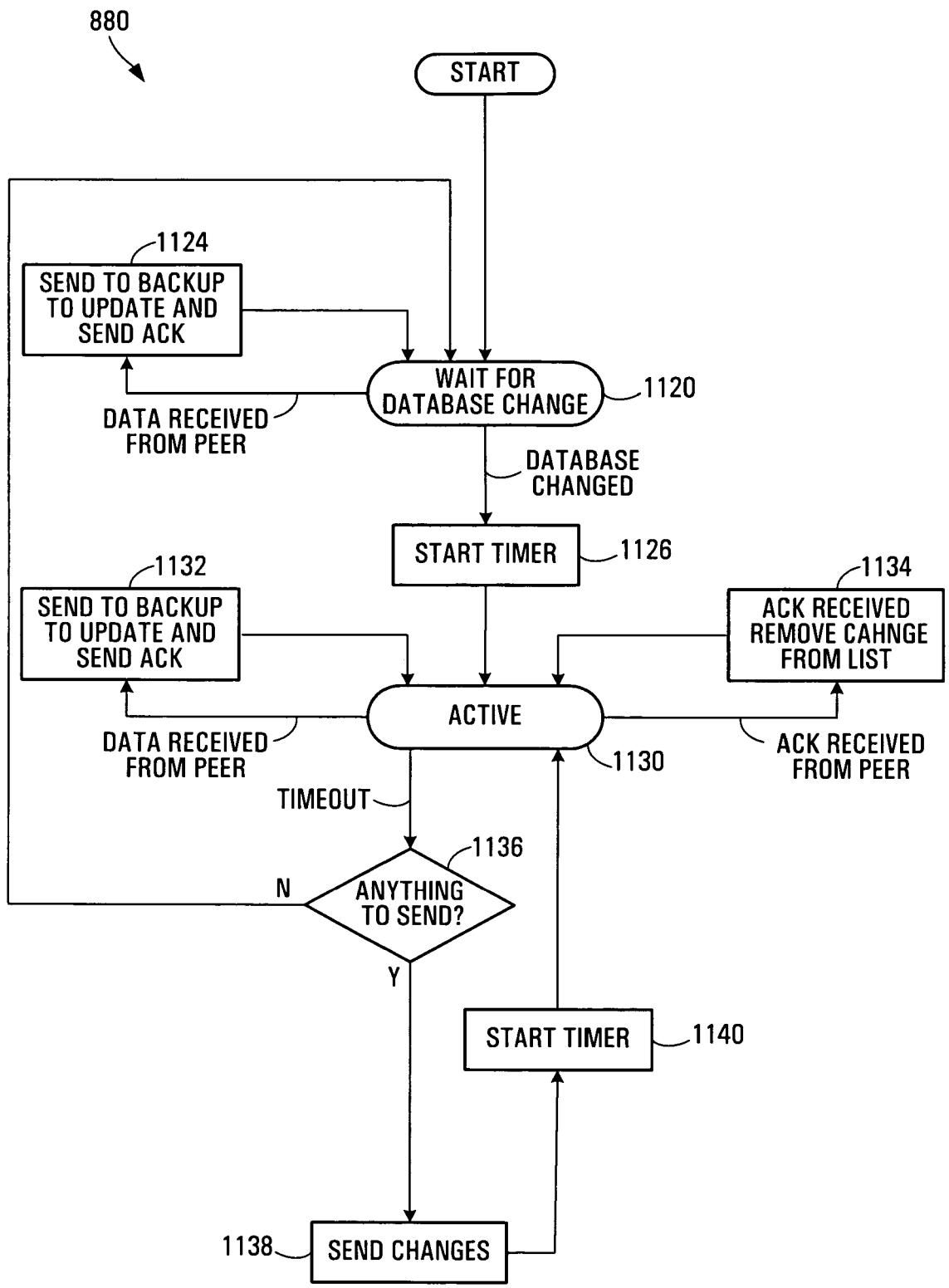
FIG. 11 is a state machine/flow chart governing operation of a Journal Manager component of a terminal set which is assigned as a backup terminal set for two other terminal sets.

FIG. 11 illustrates is a state machine/flow chart governing operation of Journal Manager 880 at a terminal set that has been assigned as a backup. FIG. 11 will be described from the perspective of terminal set A which is assumed to be serving as a backup for each of terminal sets B and C.

Initially, the journal manager 880 of the terminal set A enters a wait for journal change state 1120. Upon receipt of an update from either one of its backups B or C (i.e. upon receipt of an indication of a change to the master's data at either of master terminal set B or C, e.g., due to user specified changes to the terminal set configuration), the appropriate one of the shadow databases 815, 828 (FIG. 8) is updated. The journal manager 880 then responds to the master terminal set which sent the update with an ACK message (1124) and returns to the wait for journal change state 1120.

If the journal manager 880 receives an indication from local journal module 850 (via observer 890) that the master database 855 has changed (such that the change should be propagated to the slaves), a timer is started (1126) and the journal manager 880 enters an active state 1130. The timer is used to check if there is any data to send, i.e. the journal manager 880 polls the observer 890 periodically (the expiry of the timer corresponds to operation 1452 of FIG. 14). It will be appreciated that an alternative embodiment could employ asynchronous notification in place of polling. In the active state 1130, once the timer expires the journal manager 880 confirms with the observer module 890 that there are changes to send to the backup terminal sets B and C (1136). If there are changes to send, then the changes are sent (1138) to both of terminal sets B and C. The timer is then reset and started (1140) and the master terminal returns to the Active state 1130.

At 1136, if there are no changes to send to the backup terminal sets B and C, then the journal manager 880 returns to the wait for journal change state 1120. From state 1130, if the Journal Manager 880 receives an ACK message from either backup terminal set responsive to the changes sent at 1138, the change may be removed from a list of changes to report and the journal manager 880 returns to the active state 1130.

While in the active state 1130, when an indication of a change is received from either of terminal sets B or C, the appropriate one of the shadow databases 815, 828 is updated (1132), and the journal manager 880 then responds to a respective one of terminal sets B and C with an ACK message. The backup terminal set Journal Manager then returns to the active state 1130.

Figure 12:
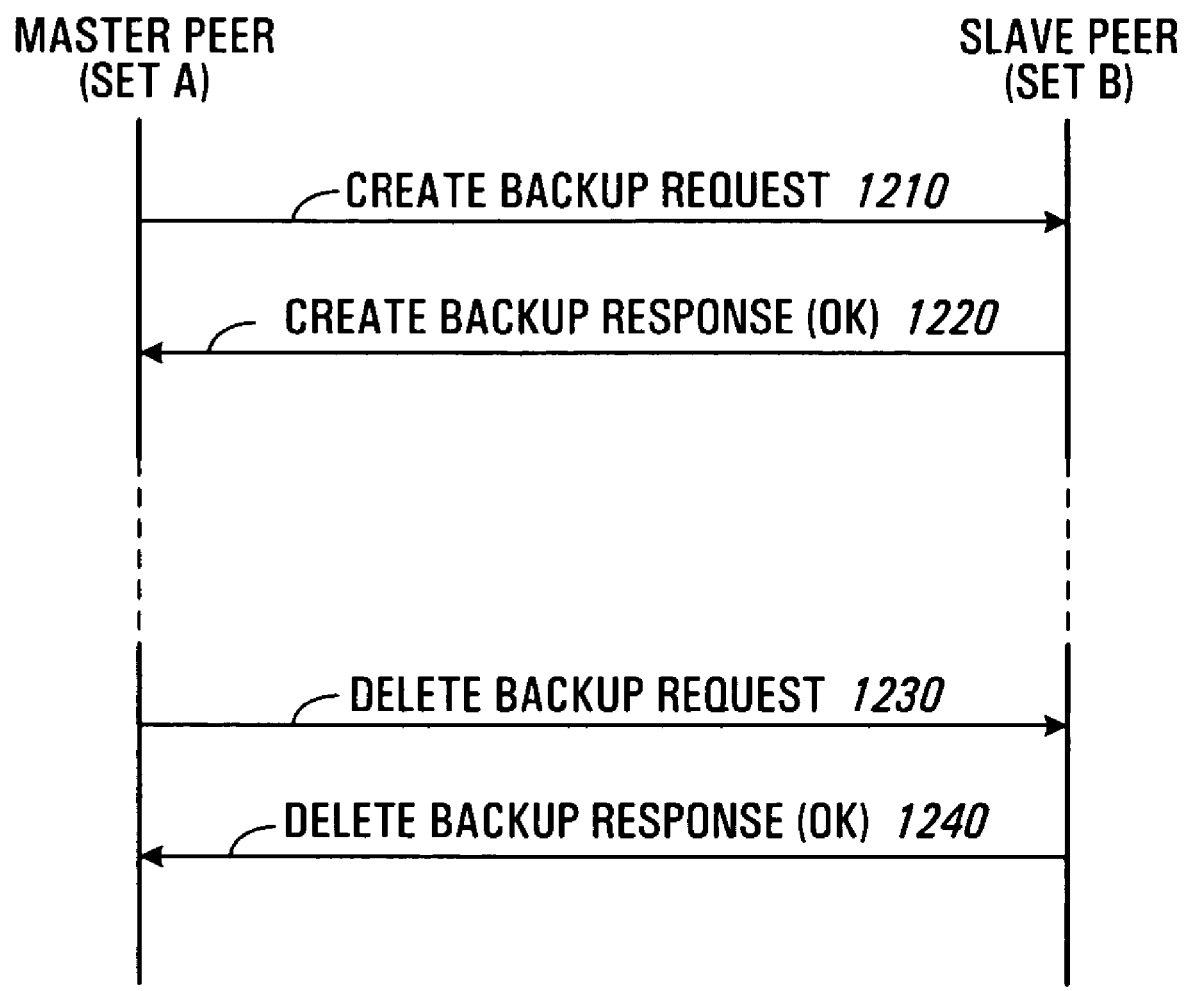
FIG. 12 is a sequence diagram illustrating signals between a master terminal set and a backup terminal set for assigning and de-assigning the backup terminal set.

FIG. 12 illustrates a sequence diagram of signals between a master terminal set and a backup terminal set for assigning and de-assigning the backup terminal set to and from the master. FIG. 12 will be described assuming that terminal set A is the master terminal set and terminal set B is the backup terminal set. In describing FIG. 12, reference will be made to FIGS. 9 and 10, which illustrate the modules 830 and 811 operating at the master terminal set A and backup terminal set B respectively.

To cause terminal set B to be assigned as its backup terminal set, terminal set A sends a Create Backup Request 1210 to terminal set B (934 of FIG. 9). This message instructs terminal set B that it is to be a backup set for terminal set A, and further results in the creation at terminal set B of a database 815, a journal 825 and an observer 860 for terminal set A. Assuming it is able to act as a backup, terminal set B responds with a positive Create Backup Response 1220 (1026 of FIG. 10). Upon receipt of the positive Create Backup Response 1220 terminal set A adds terminal set B as an observer 890 to the local journals 851 maintained by local journal module 850 at terminal set A (944 of FIG. 9). At this stage, terminal set B has become the backup for terminal set A. Accordingly, terminal set A is in the Active state 950 (FIG. 9) and terminal set B is in the Active state 1030 (FIG. 10).

Referring again to FIG. 12, if at some later time terminal set B is no longer required as a backup for terminal set A, terminal set A sends a Delete Backup Request 1230 (958 of FIG. 9) to terminal set B. Upon receipt of the Delete Backup Request 1230, terminal set B deletes all databases and journals associated with terminal set A (1034 of FIG. 10) and, assuming this is successful, responds with a positive Delete Backup Response 1240 (1038 of FIG. 10). At this stage, terminal set B is no longer the backup for terminal set A, and accordingly terminal set A is in the Idle state 920 (FIG. 9) and terminal set B is in the idle state 1020 (FIG. 10).

Figure 13:
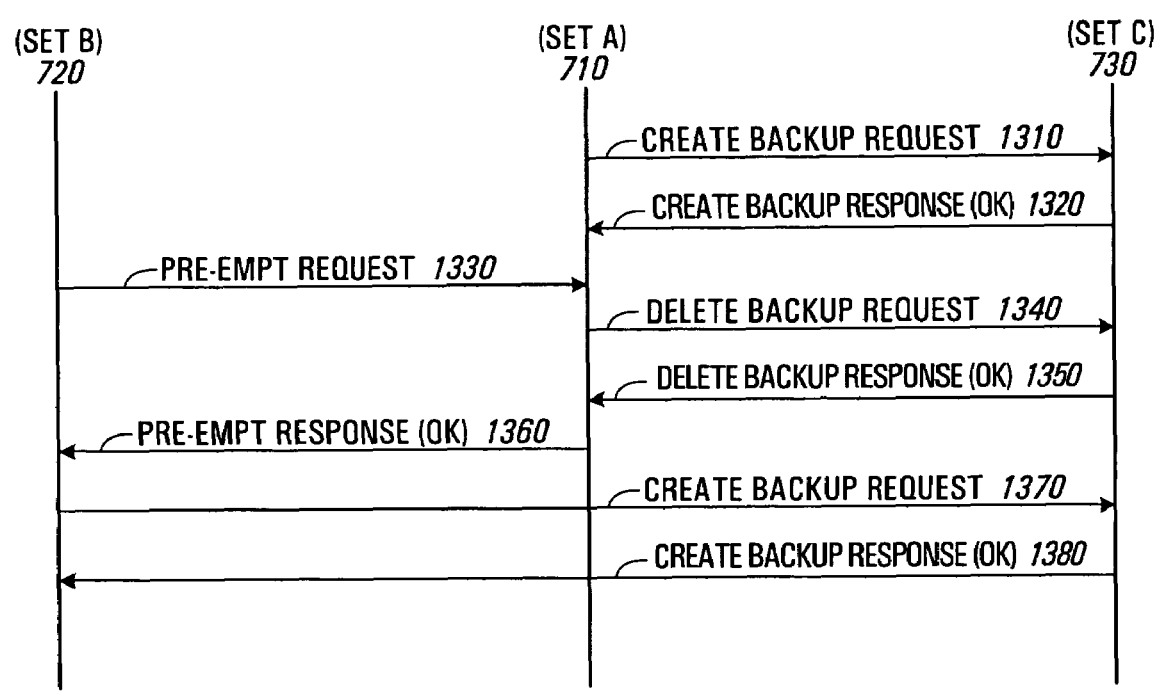
FIG. 13 is a sequence diagram for a master terminal set pre-empting another master terminal set from having a backup terminal set, according to another embodiment of the invention.

FIG. 13 illustrates a sequence diagram for a master terminal set pre-empting the backup terminal set assignment of another master terminal set. As an illustrative example, in FIG. 13 terminal set A is initially assumed to have terminal set C as a backup terminal set, and it is assumed that that terminal set B takes steps to acquire terminal set C as its backup terminal set. In describing FIG. 13, reference will be made to FIG. 9, which illustrates operation of module 830 (and/or 840) at the terminal set A, and FIG. 10, which illustrates operation of module 811 (and/or 821) at terminal sets B and C respectively.

Initially, it is assumed that the Create Backup request and Create Backup Response messages 1310 and 1320 have been exchanged between terminal sets A and C in the manner described above with respect to FIG. 12, so as to result in terminal set C being assigned as backup for terminal set A.

At some later time, terminal set B, wishing to acquire terminal set C as its backup, sends a pre-empt request 1330 to terminal set A (924 of FIG. 9). Upon receipt of the pre-empt request 1330, terminal set A causes the terminal set C to be de-assigned as its backup terminal set by exchanging Delete Backup Request and Delete Backup Response messages 1340 and 1350 with terminal set C, as described above (see 954 of FIG. 9 and 1038 of FIG. 10). Upon receipt of the positive delete backup response 1350, terminal set A sends a positive pre-empt response 1360 (964 of FIG. 9) to terminal set B, indicating that terminal set C is now available as a backup. Terminal set B then exchanges Create Backup Request and Create Backup Response messages 1370 and 1380 with terminal set C as described above to cause terminal set C to become a backup for terminal set B.

Figure 14:
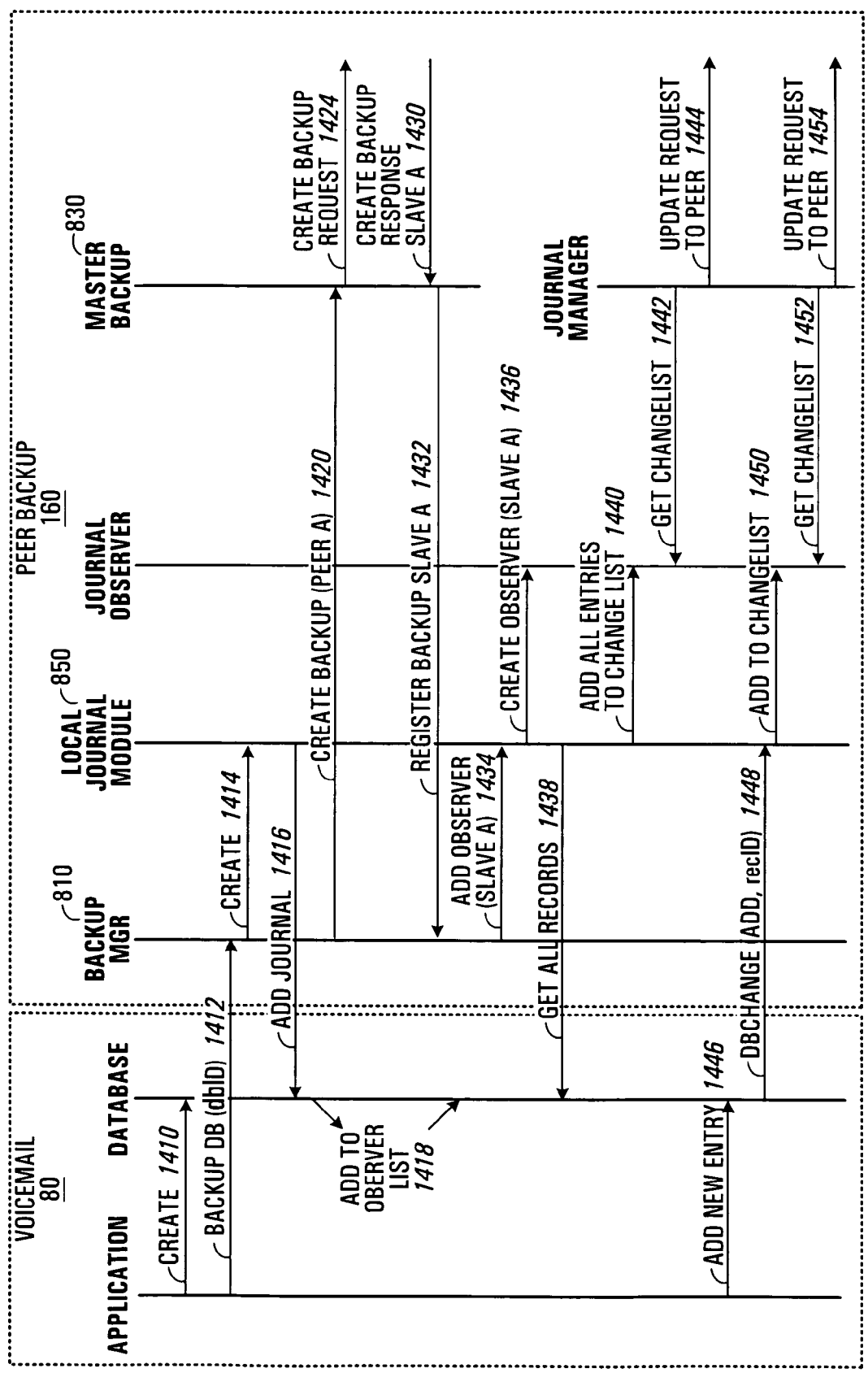
FIG. 14 is a sequence diagram for messaging by a terminal set serving as master terminal set when an application is initialized.

FIG. 14 illustrates a sequence diagram for messaging by terminal set A in its role as master terminal set for terminal B when an application is initialized. In FIG. 14, the process followed by terminal set A is shown for an illustrative example in which it is desired for the backup terminal set to backup a voicemail application forming part of voice mail module 80. However, the invention is not limited backup of voice mail applications. It may also be used to backup user preferences and speed dial for example for, e.g., a "Call Control" application which governs how an incoming call is to be handled.

When the application within the voice mail module 80 is initialized, the voice mail module 80 creates a database as shown by signal 1410 (more than one database may be created in alternative embodiments (e.g. multiple databases could be used to segregate voice-mail data by priority, such as high-priority messages vs. standard priority messages, for example). Because it is desired for the database to be backed up on another terminal set (terminal set B), the Application sends a Backup DB message 1412 containing a database ID to the Backup Manager 810 of the peer backup module 160 of terminal set A. Upon receipt of the Backup DB message 1412, the Backup Manager 810 sends a signal 1414 to the local journal module 850 to create a local journal for the voice mail application. The journal represents a set of changes which have recently occurred to the database. In turn, the local journal module 850 sends a message 1416 to the database to add local journal module 850 as an observer and adds the observer to its list (1418). The purpose of the observer is to track changes in the database. The Backup Manager 810 sends a create backup message 1420 to the master backup module 830 requesting the master backup module 830 to create a database and a journal and assign an observer for the journal on terminal set B. In FIG. 14, for purposes of clarity the request made through the create backup message 1420 is shown being sent to the master backup module 830 only; however, it is to be understood that a similar request is made for the master backup module 840 having regard to creating a database and a journal and assigning an observer for the journal on terminal set C.

The master backup module 830 sends a request 1424 to terminal set B instructing terminal set B to create a database and a journal at the backup terminal set (terminal set B) for the application and assign an observer at terminal set B for the journal at terminal set B. Terminal set B responds with a positive create backup response 1430 indicating that B agrees to be a backup, and appropriate Journal entries have been created. The master backup module 830 then sends a register backup message 1432 to the backup manager 810 requesting the backup manager 810 to register terminal set B as a backup terminal set. The backup manager 810 then sends a signal 1434 requesting the local journal module 850 to add terminal set B as an observer. The local journal module 850 then sends a create observer message 1436 to the observer module 890 to create an observer (at terminal set A) for terminal set B. The local journal module 850 sends a signal 1438 to the voice mail module 80 to retrieve records from the database of the voice mail module 80. The local journal module 850 then sends a signal 1440 to the observer module 890 instructing the observer module 890 to add entries representative of the retrieved records in the local journals maintained by the local journal module 850 in a change list (i.e. a set of modifications to the database that need to be transmitted to a given backup) for the application.

At a later time, the journal manager 880 sends a get change list message 1442 to the observer module 730 (e.g. when the device has resumed being available after a period of unavailability) to retrieve the change list for the application from the observer module 890. The journal manager 880 then sends an update request message 1444 to terminal set B instructing terminal set B to update a respective database for the application.

As shown in FIG. 14, as the voice mail application generates new data (e.g. after a voice mail message has been left by a caller), the data are added or modified in the database of the voice mail module 80 through signaling 1446. The generation of new data in turn causes the database of voice mail module 80 to signal the local journal module 850 with DB change updates 1448 containing the new data from the database in the voice mail module 80. In response, the local journal module 850 adds the new data to the local journal for the application and sends a message 1450 to the observer module 890 instructing the observer module 890 to update the change list for the application. At a later time, the journal manager 880 sends a get change list message 1452 to the observer module 890 to retrieve the change list for the application from the observer module 890. The journal manager 880 then sends an update request message 1454 to terminal set B instructing terminal set B to update a corresponding database for the application.

Figure 15:
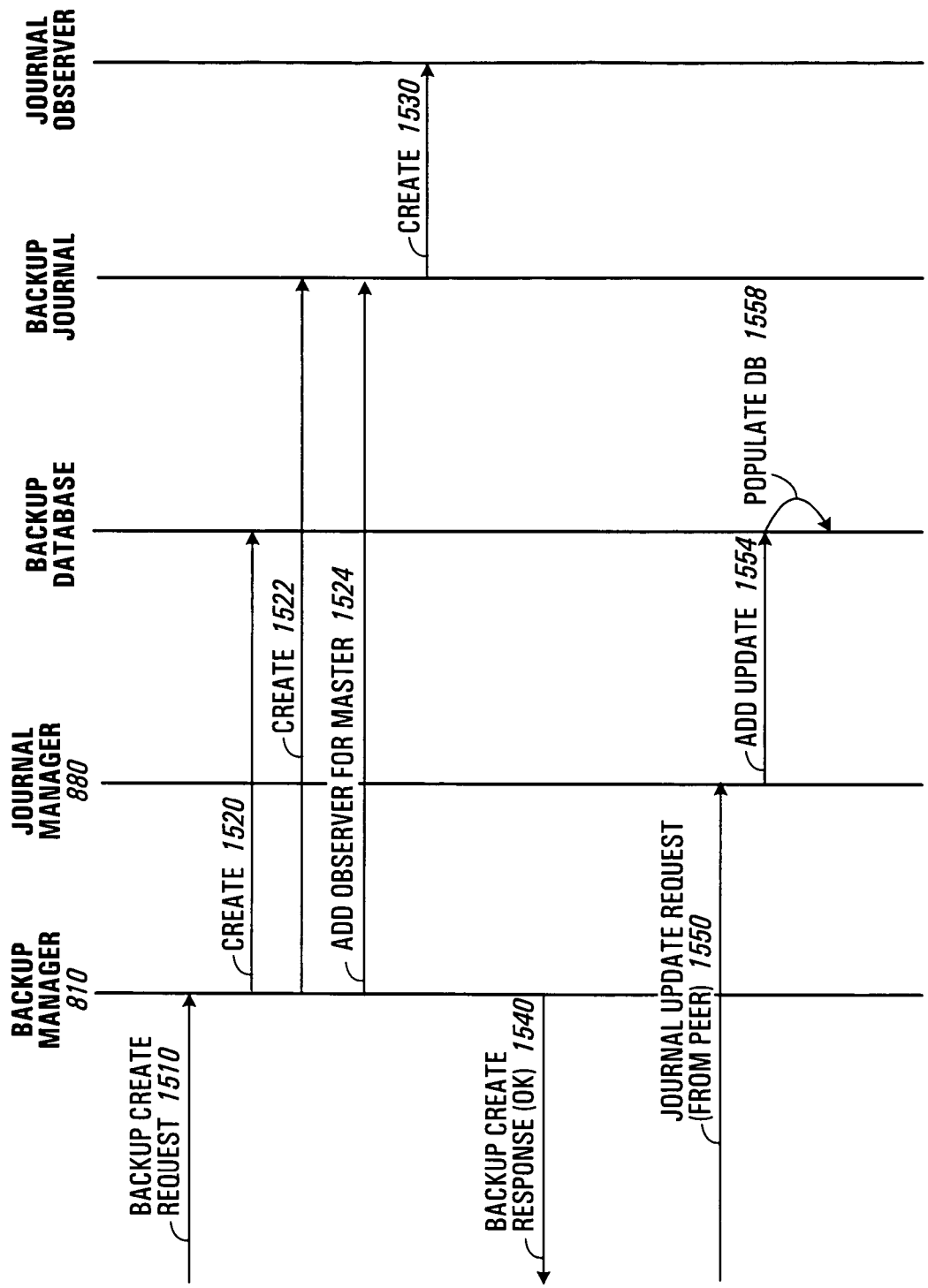
FIG. 15 is a sequence diagram for messaging by a terminal set serving as a first backup terminal set for another terminal set when an application is initialized.

FIG. 15 illustrates a sequence diagram showing messaging at a backup terminal set when it becomes a backup for another terminal set. In the present example, operation is described at terminal set B as it assumes the role of backup for terminal set A.

Initially, terminal set B receives a Backup Create Request 1510 from the master terminal set A which constitutes a request for terminal set B to acts a set A's backup. The backup manager 810 at terminal set B sends a create a backup database (i.e. shadow database) message 1520 to the database module 814 (also at slave terminal set B) to create a database for the data from an application, e.g., a voice mail application, running on the master. The backup manager 810 thereafter sends a create a backup journal message 1522 to the journal module 816 (all within terminal set B) instructing the backup journal module 816 to create backup journal 825 for the application running on terminal set B. The backup manager 810 at terminal set B also sends a message 1524 to the journal module 816 instructing the latter module to add the Master terminal set A as an observer to the backup database. In addition, the other backup terminal set (i.e. the second slave) of terminal set A is added as an observer to the backup database.

The backup journal module 816 then sends a create signal 1530 to the observer module 860 instructing the latter module to create an observer for the application running of the master terminal set at the backup terminal set. The backup manager 810 at terminal set B then initiates a backup create response OK message 1540 to the master terminal set A indicating that terminal set B is now assigned as a backup for terminal set A. This message confirms that a database, backup journal and an observer have been created for the application running on master terminal set A.

At a later time, the master terminal set A sends a journal update request 1550 to backup terminal set B which is received by the journal manager 880 of terminal set B. The journal manager 880 of terminal set B sends an update message 1554 to the backup database module 814 at terminal set B which populates the backup database 815 that was created for the application on terminal set B.

Figure 16:
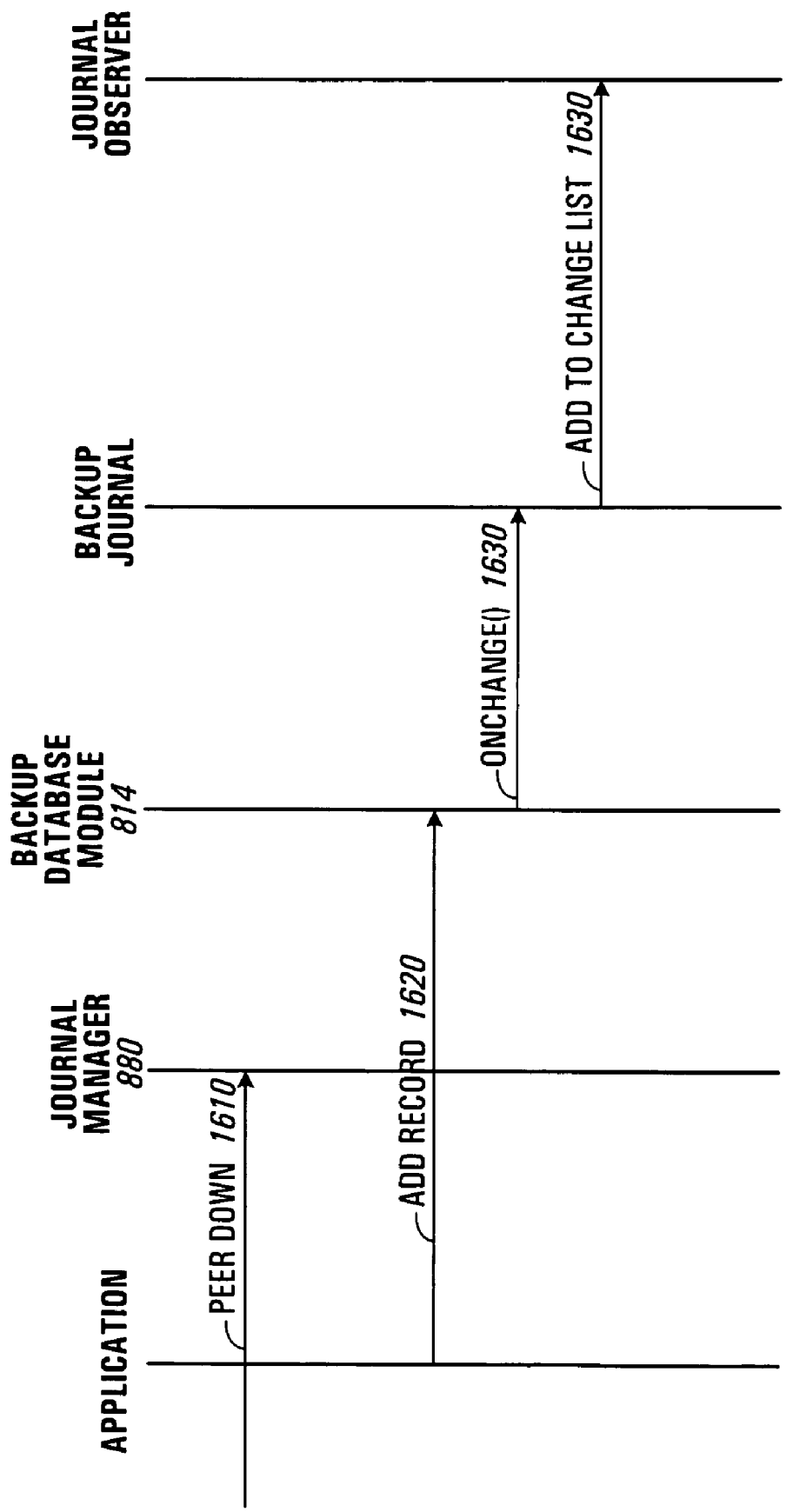
FIG. 16 is a sequence diagram for a terminal set serving as a backup terminal set for a master terminal set when the master terminal set is unavailable.

FIG. 16 illustrates a sequence diagram at a backup terminal set when the backup's master terminal set is unavailable. In the present example, the backup terminal set is assumed to be terminal set A and the master terminal set is assumed to be terminal set B (FIG. 6).

When the master terminal set B is unavailable to receive calls, the journal manager 880 of slave terminal set A receives a message 1610 (e.g. from a peer-to-peer subsystem or module which monitors the "up/down" status of all peers) indicating that the journal manager 880 should not send updates regarding local changes to A's copy of B's database to master terminal set B. Calls intended for master terminal set B are directed to the primary backup (terminal set A). For example, a peer-to-peer subsystem at the terminal set initiating the call may instruct its "Call Control" application to deliver calls for terminal set B to terminal set A when set B is down. While the application at slave terminal set A is running on behalf of the application at master terminal set B, when a change to the database associated with the application occurs, the application running at slave terminal set A sends an add record message 1620 to the backup database module 814 requesting that the change be recorded. The backup database module 814 implements the changes in the database 815 and notifies the backup journal module 816 (via message 1630) for recordal of the changes in a journal associated with the database. The backup journal module then sends an add to change list message 1640 to the observer module 860.

Figure 17:
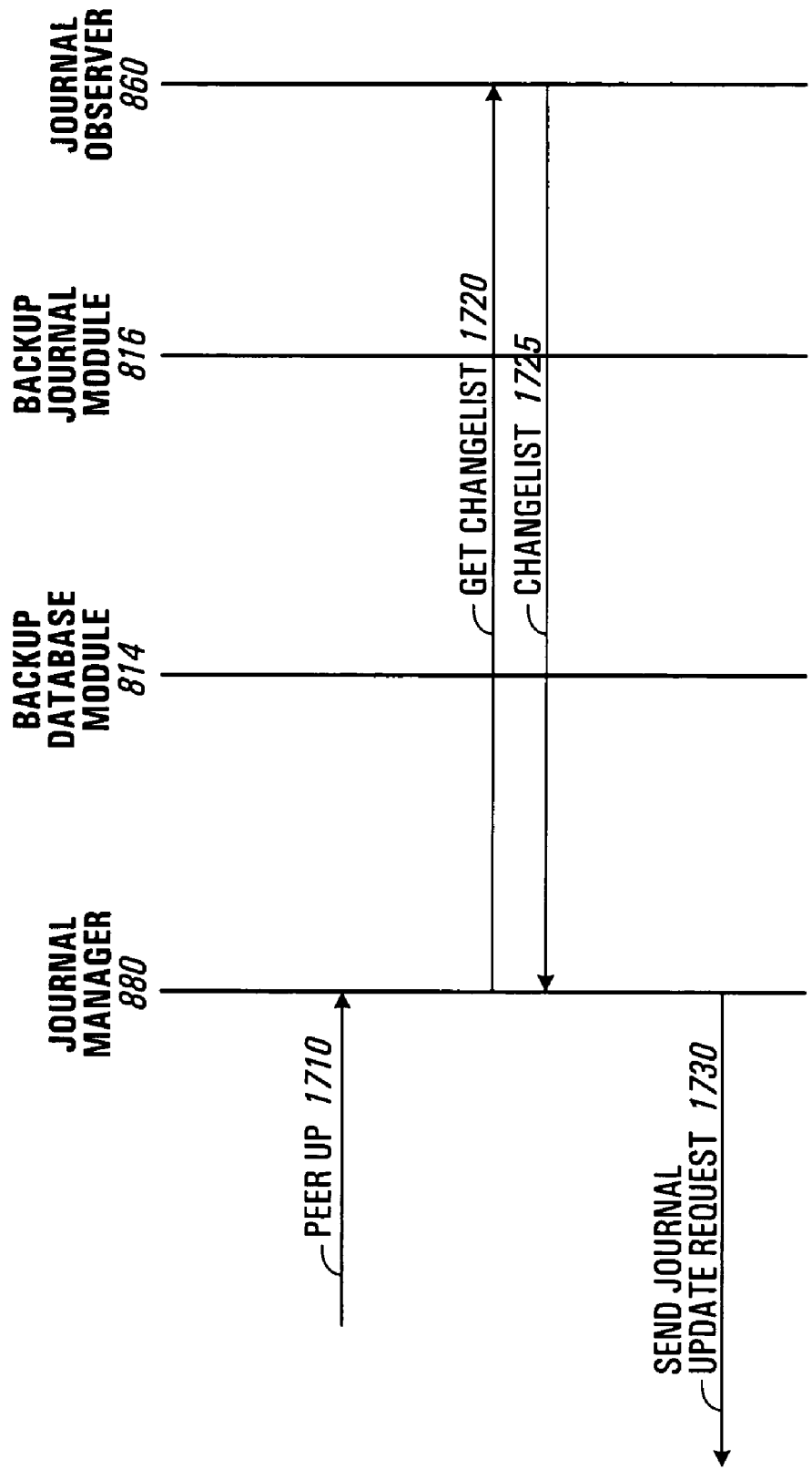
FIG. 17 is a sequence diagram for a terminal set serving as a backup terminal set for a master terminal set when the master terminal set has become available.

FIG. 17 illustrates a sequence diagram for a backup terminal set when its master terminal set has become available after a period of unavailability. In the following description of FIG. 17, it is assumed that terminal set A is the master terminal set and that terminal set B is the backup terminal set.

When terminal set A becomes available to accept calls after being unavailable, a peer up message 1710 is received by the journal manager 880 of backup terminal set B (e.g. from a peer-to-peer subsystem or module local to set B which monitors the status of B's peers). The journal manager 810 at terminal set B sends a get change list message 1720 to the journal observer module 860 at terminal set B for retrieval of a change list associated with changes that were made to terminal set A's information (in terminal set B's shadow database) while terminal set A was unavailable. The journal observer module 860 forwards the change list to the journal manager 880 at terminal set B in a message 1725. The journal manager 880 then initiates and transmits a journal update request 1730 to master terminal set A.

Figure 18:
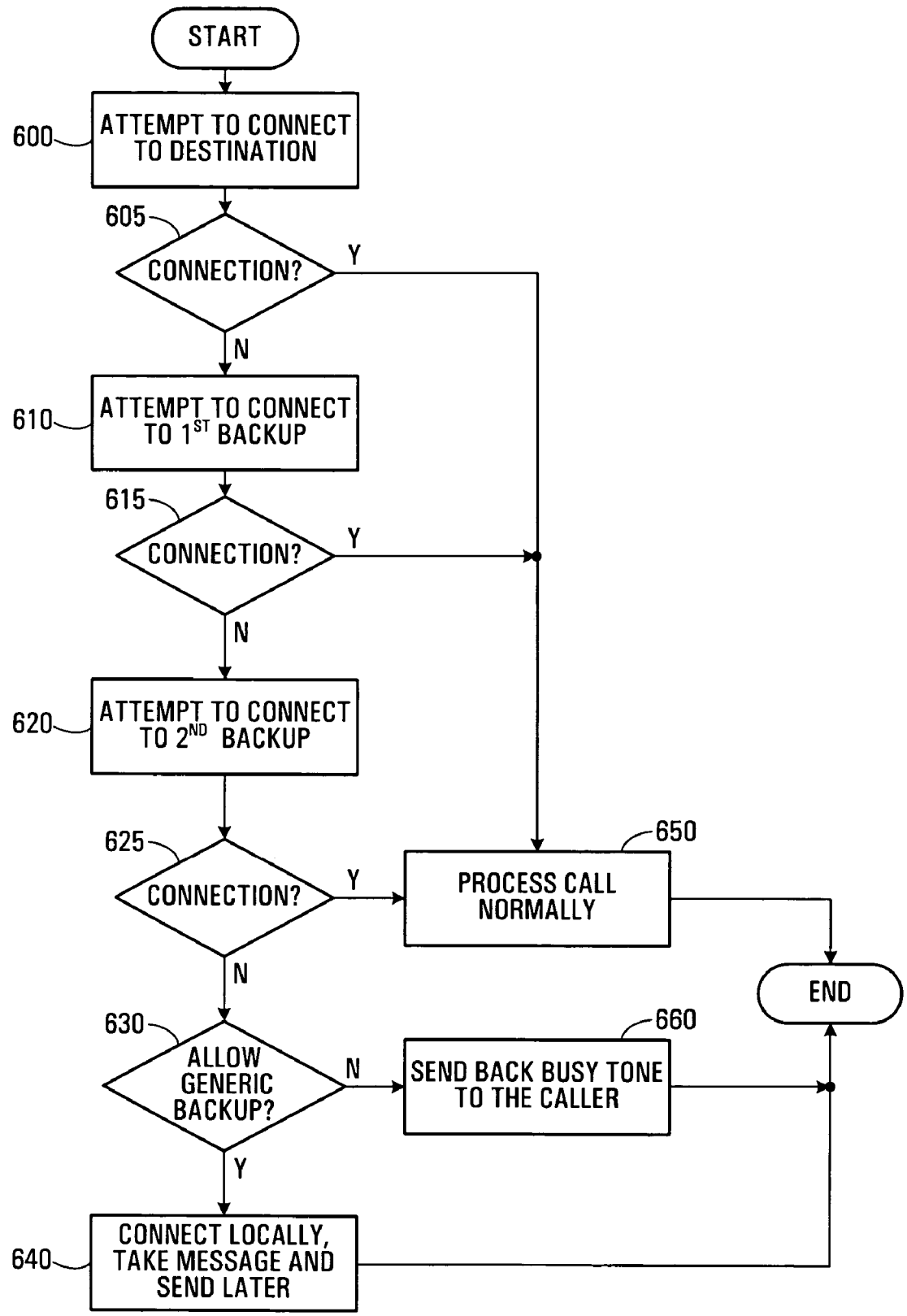
FIG. 18 is a flow chart of a method of initiating a call to a destination terminal set in the telephone system of FIG. 1.

FIG. 18 illustrates a flow chart of operation for initiating a call to a destination terminal set in the telephone system 10 of FIG. 1 after backups have been assigned.

An originator of a call, e.g. one of the telephone terminal sets connected to the network 30, attempts to connect to another telephone terminal on network 30 (600), e.g., in response to entry of the DN of the desired destination set by a user of the originator terminal set. If the destination terminal set is unavailable (605), for example because the destination telephone set is disconnected from the network, has lost port, or because all of the call processing threads 72, 73, 74 and 75 (FIG. 4) of the destination set are in use, then a first backup is identified by the originating telephone set from column 260 of its local routing table 200.

Using the corresponding a destination address from one of columns 220 or 230, the originating terminal set then attempts to call the primary backup terminal set (610). If this call fails (i.e. if the primary backup is also unavailable), then information regarding the secondary backup number for the unavailable master is retrieved from column 270 of routing table 200. A call is then attempted to the secondary backup set, using the destination address of that set as retrieved from the table 200 (620).

It is noted that a terminal set to which a call has been attempted may only ring to signify a call to be answered in the event that the recipient terminal set is available to take the call. In any other case, the call may simply be processed by a call processing thread in cooperation with the voice mail module of the terminal answering the call, without ringing of the associated terminal set.

In some embodiments, a generic call processing capability is provided which is not terminal specific. Generic call processing may for example include the playing of a generic voicemail greeting (e.g. "This party is not available. Please leave a message.") instead of a personalized greeting.

When call is received by either the terminal set to which the call was intended or by a terminal set which has been activated as a backup of that terminal set, the terminal set accepts the call in a manner which suggests to the originator that the call was successfully completed to the desired destination telephone set. This might for example involve playing personalized voice mail greetings for the desired telephone set and any user options handling for voice mail or call forwarding.

In contrast, the generic call processing capability allows a terminal to accept a call on behalf of a terminal set for which it has not been designated as backup. Generic processing capabilities are illustrated in FIG. 18.

As shown in FIG. 18, generic call processing occurs in the present embodiment when all of the backups (i.e. both primary and secondary) are unavailable. At 630, if the call attempted at 620 to the secondary backup (i.e. "second level backup") has fails, then the originator terminal set may optionally answer the call on behalf of the destination terminal set (630 and 640). This would be necessarily be done in a generic manner since the originating terminal does not have any destination terminal specific call processing capabilities.

Any database changes resulting from completion of the generic call are treated the same as for a standard call completion, i.e., are propagated by the Journal Manager 890 (FIG. 8) to the appropriate set(s).

In embodiments where generic call processing is not available, instead of performing a generic call answer, a busy tone is played to the caller if all of the backup terminals are unavailable (660). If any of the attempts of steps 600, 610, 620 are successful, then the call is accepted and processed by the relevant set (650).

As will be appreciated by those skilled in the art, modifications to the above-described embodiment can be made without departing from the essence of the invention. For example, although the described embodiment largely refers to peers that are terminal sets, it will be appreciated that the described methods are equally applicable to peers other than terminal sets, such as other forms of network devices. As well, network devices may be interconnected by any form of network, not just a LAN. Further, although the peer discovery description refers to the selection, probing and assertion of directory numbers, it will be appreciated that the described methods are equally applicable to network addresses other than directory numbers.

It will be appreciated that the number of backup levels (i.e. the number of backups per master) may differ from the two backup levels of the described embodiment. Generally, there may be up to N backup levels, where N is an integer greater than or equal to one.

Moreover, while the terminal sets in the above-described embodiment are "symmetric" in the sense that each terminal set acts as a backup N times and itself has N backups, this need not be the case in all embodiments.

It is also noted that the routing table 200 shown in FIG. 5 is a very specific example of the type of information which might be maintained. Alternative embodiments may include different information in their routing tables. For example, backup terminal sets may be identified in some manner other than by MAC address.

For certainty, it is noted that invention is not limited to terminal sets providing backup functionality for other terminal sets. In some embodiments of the invention, other network devices such as a TTI may provide backup functionality or may benefit from backup functionality from other network devices.

Further, while the term "reliability" as used above refers to the ability of a terminal set to reliably establish a connection outside of the distributed telephony system (e.g. receive a call from the PSTN), it should be appreciated that this term may have other meanings for other types of network devices. In general, the term "reliability" refers to the probability that a network device will be able to achieve a desired objective or complete a desired task, which probability may vary network device to network device.

Finally, while the network devices in the described embodiments are peers in a peer-to-peer network, it will be appreciated that this is not required. The described backup approach may be used to back up network devices which are not necessarily classifiable as "peers" on networks which are not necessarily classifiable as "peer-to-peer" networks.

Numerous modifications and variations of the present invention are possible in light of the above teachings. For example, embodiments of the invention are not limited to the above terminal being telephone terminal sets and in some embodiments of the invention the terminal set are any network communication devices. It is therefore to be understood that within the scope of the appended claims, the invention may be practiced otherwise than as specifically described herein.

What is claimed is:

1. At a first network device of a plurality of network devices each storing device-specific information, a method comprising:
   selecting at least one second network device of said plurality of network devices to act as a backup for said first network device;
   communicating the device-specific information maintained by said first network device to said at least one second network device, said communicated device-specific information for use by said at least one second network device in assuming the role of said first network device upon unavailability of said first network device;
   receiving at said first network device device-specific information from at least one third network device for use by said first network device in assuming the role of the third network device upon unavailability of the third network device, and
   when the device-specific information of said first network device is requested and said first network device is unavailable, communicating the device-specific information of said first network device from one of said at least one second network device.

2. The method of claim 1 wherein said at least one second network device comprises N second network devices and wherein said at least one third network device comprises N third network devices, N being an integer greater than or equal to one.

3. The method of claim 2 wherein said selecting is based on a reliability of said first network device and a reliability of each of said N second network devices.

4. The method of claim 3 wherein said plurality of network devices is interconnected by a network and wherein the reliability of a network device comprises a probability of that network device being able to establish a connection with a device external to said network.

5. The method of claim 2 wherein said selecting comprises:
   identifying a fourth network device assigned to a fifth network device as a backup network device;
   sending a communication causing said fourth network device to be deassigned from said fifth network device; and
   claiming said fourth network device as a backup network device for said first network device.

6. The method of claim 5 wherein said identifying is based on a reliability of said fourth network device.

7. The method of claim 5 further comprising repeating said identifying, said sending and said claiming N times.

8. The method of claim 1 further comprising, upon detecting a change to said device-specific information at said first network device, communicating said change to each of said N second network devices.

9. The method of claim 1 further comprising, upon receiving from one of said at least one third network device an indication of a change to the device-specific information stored at said one of said at least one third network device, communicating said changed device-specific information to said first network device.

10. The method of claim 1 further comprising, upon said first network device becoming available after a period of unavailability:
    receiving changes to said device-specific information of said first network device from one of said at least one second network device; and incorporating said changes into said device-specific information stored at said first network device.

11. At one network device of a plurality of network devices, a method comprising:
- selecting at least one other network device of said plurality of network devices to act as a backup for said one network device, said selecting resulting in the selection of at least one backup network device;
- communicating information maintained by said one network device to each said backup network device, said communicated information for use by said backup network device in assuming the role of said one network device upon unavailability of said one network device; and
- receiving information from at least one network device distinct from said one network device which has selected said one network device as its backup so as to become a master network device, said received information for use by said one network device in assuming the role of the master network device upon unavailability of the master network device;
- wherein said at least one backup network device comprises N backup devices and wherein said at least one master network device comprises N master devices, N being an integer greater than or equal to one;
- wherein said selecting is based on a reliability of said one network device and a reliability of each of said N backup devices; said method further comprising:
- grouping said plurality of network devices into M pools of prospective backups, each network device in a pool of prospective backups having the same reliability, M being an integer greater than or equal to one;
- choosing the pool of prospective backups having the highest reliability as the current pool of prospective backups;
- setting a current backup level to a first backup level, said backup level indicating the relative order in which a backup network device will, in the event of unavailability of a particular network device to which said backup network device is assigned as well as the unavailability of all other network devices assigned as backup network devices to said particular network device at lower backup levels, assume the role of said particular network device in relation to said other backup network devices;
- assigning, at the current backup level, network devices from the current pool of prospective backups to said plurality of network devices in increasing order of reliability of the assignee network devices such that no network device is an assignee of more than one backup network device at the current backup level, until either:
  - (a) every network device in the current pool of prospective backups has been assigned as a backup network device N times; or
  - (b) each of said plurality of network devices is an assignee of a backup network device at the current backup level.

12. The method of claim 11 further comprising, upon the occurrence of (a): choosing another pool of prospective backups as the current pool of prospective backups in decreasing order of reliability; and repeating said assigning.

13. The method of claim 12 further comprising: repeating said choosing and said repeating until each of said plurality of network devices is an assignee of N backup network devices.

14. The method of claim 11 further comprising, upon the occurrence of (b): if the current backup level is less than N, incrementing the current backup level to a next backup level; and repeating said assigning.

15. The method of claim 14 further comprising: repeating said incrementing and said repeating until each of said plurality of network devices is an assignee of N backup network devices.

16. The method of claim 11 further comprising, upon detecting the unavailability of a master network device, assuming the role of said master network device.

17. The method of claim 16 wherein said assuming the role of said master network device is conditional upon detecting the unavailability of every other backup network device assigned as a backup to the same master network device at a lower backup level than said one network device.

18. The method of claim 16 further comprising, after assuming the role of said master network device, tracking any changes to the received information from said master network device.

19. The method of claim 18 further comprising, upon the occurrence of changes to the received information of said master network device:
- identifying any other backup network devices assigned to said master network device; and communicating said changes to said other backup network devices assigned to said master network device.

20. The method of claim 18 further comprising, upon detecting availability of said master network device:
- yielding the role of said master network device to said master network device; and communicating any changes to the received information from said master network device to said master network device.

21. At one network device of a plurality of network devices, a method comprising:
- selecting at least one other network device of said plurality of network devices to act as a backup for said one network device, said selecting resulting in the selection of at least one backup network device;
- communicating information maintained by said one network device to each said backup network device, said communicated information for use by said backup network device in assuming the role of said one network device upon unavailability of said one network device;
- receiving information from at least one network device distinct from said one network device which has selected said one network device as its backup so as to become a master network device, said received information for use by said one network device in assuming the role of the master network device upon unavailability of the master network device; and
- wherein said network devices are terminal sets capable of initiating and accepting calls and wherein unavailability comprises an inability to accept an incoming call.

22. The method of claim 21 further comprising:
determining whether a proposed destination network device is available; and
initiating a call based on said determining.

23. The method of claim 22 wherein said initiating a call comprises, if said determining determines said proposed destination network device to be unavailable:
- identifying a backup network device of said proposed destination network device; and initiating a call to said identified backup network device.

24. The method of claim 23 wherein said initiating a call to said identified backup network device is conditional upon determining said identified backup network device to be available.

25. The method of claim 24 further comprising repeating said identifying and said initiating until either an identified backup network device is found to be available or until it is determined that said proposed destination network device has no available backup network devices.

26. The method of claim 25 further comprising, if it is determined that said proposed destination network device has no available backup network devices, accepting said call at said one network device.

27. A first network device of a plurality of network devices each storing device-specific information, adapted to:
  select at least one second network device of said plurality of network devices to act as a backup for said first network device;
  communicate the device-specific information maintained by said first network device to said at least one second network device, said communicated device-specific information for use by said at least one second network device in assuming the role of said first network device upon unavailability of said first network device; and
  receive information from at least one third network device for use by said one network device in assuming the role of the at least one third network device upon unavailability of the at least one third network device;
  wherein, when the device-specific information of said first network device is requested and said first network device is unavailable, the device-specific information of said first network device is communicated from one of said at least one second network device.

28. The network device of claim 27 wherein said at least one second network device comprises N second network devices and wherein said at least one third network device comprises N third network devices, N being an integer greater than or equal to one.

29. The network device of claim 28 wherein said selecting is based on a reliability of said first network device and a reliability of each of said N second network devices.

30. The network device of claim 29 wherein said plurality of network devices is interconnected by a network and wherein the reliability of a network device comprises a probability of that network device being able to establish a connection with a device external to said network.

31. The network device of claim 28 wherein said selecting comprises:
  identifying a fourth network device assigned to a fifth network device;
  sending a communication causing said fourth network device to be deassigned from said fifth network device; and
  claiming said fourth network device as a backup network device for said first network device.

32. The network device of claim 31 wherein said identifying is based on a reliability of said fourth network device.

33. The network device of claim 31 further adapted to repeat said identifying, said sending and said claiming N times.

34. The network device of claim 27 further adapted to, upon detecting a change to said device-specific information at said first network device, communicate said change to each of said N second network devices.

35. The network device of claim 27 further adapted to, upon receiving from the at least one third network device an indication of a change to the device-specific information of said at least one third network device, saving the changed device-specific information of said at least one third network device at said first network device.

36. The network device of claim 27 further adapted to, upon said first network device becoming available after a period of unavailability:
  receive changes to the device-specific information of said first network device from one of said at least one second network device; and
  incorporate said changes into the device-specific information of said first network device.

37. A network device of a plurality of network devices, adapted to:
  select at least one other network device of said plurality of network devices to act as a backup for said one network device, said selecting resulting in the selection of at least one backup network device;
  communicate information maintained by said one network device to each said backup network device, said communicated information for use by said backup network device in assuming the role of said one network device upon unavailability of said one network device; and
  receive information from at least one network device distinct from said one network device which has selected said one network device as its backup so as to become a master network device, said received information for use by said one network device in assuming the role of the master network device upon unavailability of the master network device,
  wherein said at least one backup network device comprises N backup devices and wherein said at least one master network device comprises N master devices, N being an integer greater than or equal to one;
  wherein said selecting is based on a reliability of said one network device and a reliability of each of said N backup devices; and
  wherein said selecting comprises:
  grouping said plurality of network devices into M pools of prospective backups, each network device in a pool of prospective backups having the same reliability, M being an integer greater than or equal to one;
  choosing the pool of prospective backups having the highest reliability as the current pool of prospective backups;
  setting a current backup level to a first backup level, said backup level indicating the relative order in which a backup network device will, in the event of unavailability of a particular network device to which said backup network device is assigned as well as the unavailability of all other network devices assigned as backup network devices to said particular network device at lower backup levels, assume the role of said particular network device in relation to said other backup network devices;
  assigning, at the current backup level, network devices from the current pool of prospective backups to said plurality of network devices in increasing order of reliability of the assignee network devices such that no network device is an assignee of more than one backup network device at the current backup level, until either;
  (a) every network device in the current pool of prospective backups has been assigned as a backup network device N times; or
  (b) each of said plurality of network devices is an assignee of a backup network device at the current backup level.

38. The network device of claim 37 further adapted to, upon the occurrence of (a):
  choose another pool of prospective backups as the current pool of prospective backups in decreasing order of reliability; and repeat said assigning.

39. The network device of claim 38 further adapted to:
  repeat said choosing and said repeating until each of said plurality of network devices is an assignee of N backup network devices.

40. The network device of claim 37 further adapted to, upon the occurrence of (b):
  if the current backup level is less than N, increment the current backup level to a next backup level; and
  repeat said assigning.

41. The network device of claim 40 further adapted to:
  repeat said incrementing and said repeating until each of said plurality of network devices is an assignee of N backup network devices.

42. The network device of claim 37 further adapted to, upon detecting the unavailability of a master network device, assume the role of said master network device.

43. The network device of claim 42 wherein said assuming the role of said master network device is conditional upon detecting the unavailability of every other backup network device assigned as a backup to the same master network device at a lower backup level than said one network device.

44. The network device of claim 42 further adapted to, after assuming the role of said master network device, track any changes to the received information from said master network device.

45. The network device of claim 44 further adapted to, upon the occurrence of changes to the received information of said master network device:
  identify any other backup network devices assigned to said master network device; and communicate said changes to said other backup network devices assigned to said master network device.

46. The network device of claim 44 further adapted to, upon detecting availability of said master network device:
  yield the role of said master network device to said master network device; and communicate any changes to the received information from said master network device to said master network device.

47. A network device of a plurality of network devices, adapted to:
  select at least one other network device of said plurality of network devices to act as a backup for said one network device, said selecting resulting in the selection of at least one backup network device;
  communicate information maintained by said one network device to each said backup network device, said communicated information for use by said backup network device in assuming the role of said one network device upon unavailability of said one network device; and
  receive information from at least one network device distinct from said one network device which has selected said one network device as its backup so as to become a master network device, said received information for use by said one network device in assuming the role of the master network device upon unavailability of the master network device,
  wherein said network devices are terminal sets capable of initiating and accepting calls and wherein unavailability comprises an inability to accept an incoming call.

48. The network device of claim 47 further adapted to:
  determine whether a proposed destination network device is available; and initiate a call based on said determining.

49. The network device, of claim 48 wherein said initiating a call comprises, if said determining determines said proposed destination network device to be unavailable:
  identifying a backup network device of said proposed destination network device; and initiating a call to said identified backup network device.

50. The network device of claim 49 wherein said initiating a call to said identified backup network, device is conditional upon determining said identified backup network device to be available.

51. The network device of claim 50 further adapted to repeat said identifying and said initiating until either an identified backup network device is found to be available or until it is determined that said proposed destination network device has no available backup network devices.

52. The network device of claim 51 further adapted to, if it is determined that said proposed destination network device has no available backup network devices, accepting said call at said one network device.

53. A machine-readable medium including machine-executable code for execution at a first network device of a plurality of network devices, comprising:
  machine-executable code for selecting at least one second network device of said plurality of network devices to act as a backup for said first network device;
  machine-executable code for communicating device-specific information maintained by said first network device to said at least one second network device, said communicated device-specific information for use by said at least one second network device in assuming the role of said first network device upon unavailability of said first network device; and
  machine-executable code for receiving device-specific information from at least one third network device for use by said first network device in assuming the role of the at least one third network device upon unavailability of the at least one third network device; and
  machine-executable code for, when the device-specific information of said first network device is requested and said first network device is unavailable, communicating the device-specific information of said first network device from one of said at least one second network device.

54. The machine-readable medium of claim 53 wherein said at least one second network device comprises N second network devices and wherein said at least one third network device comprises N third network devices, N being an integer greater than or equal to one.

55. The machine-readable medium of claim 54 wherein said selecting is based on a reliability of said first network device and a reliability of each of said N second network devices.

56. The machine-readable medium of claim 55 wherein said plurality of network devices is interconnected by a network and wherein the reliability of a network device comprises a probability of that network device being able to establish a connection with a device external to said network.

57. The machine-readable medium of claim 54 wherein said selecting comprises:
  identifying a fourth network device assigned to a fifth network device;
  sending a communication causing said fourth network device to be deassigned from said fifth network device; and
  claiming said fourth network device as a backup network device for said first network device.

58. The machine-readable medium of claim 57 wherein said identifying is based on a reliability of said fourth network device.

59. The machine-readable medium of claim 57 further comprising machine-executable code for repeating said identifying, said sending and said claiming N times.

60. The machine-readable medium of claim 53 further comprising machine-executable code for, upon detecting a change to said device-specific information of said first network device, communicating said change to each of said N second network devices.

61. The machine-readable medium of claim 53 further comprising machine-executable code for, upon receiving from the at least one third network device an indication of a change to the device-specific information of said at least one third network device, incorporating said change into the device-specific information of said at least one third network device stored at said first network device.

62. The machine-readable medium of claim 53 further comprising machine-executable code for, upon said first network device becoming available after a period of unavailability:
receiving changes to said device-specific information of said first network device from one of said at least one second network device; and
incorporating said changes into the device-specific information of said first network device stored at said first network device.

63. A machine-readable medium including machine-executable code for execution at one network device of a plurality of network devices, comprising:
machine-executable code for selecting at least one other network device of said plurality of network devices to act as a backup for said one network device, said selecting resulting in the selection of at least one backup network device;
machine-executable code for communicating information maintained by said one network device to each said backup network device, said communicated information for use by said backup network device in assuming the role of said one network device upon unavailability of said one network device; and
machine-executable code for receiving information from at least one network device distinct from said one network device which has selected said one network device as its backup so as to become a master network device, said received information for use by said one network device in assuming the role of the master network device upon unavailability of the master network device;
wherein said at least one backup network device comprises N backup devices and wherein said at least one master network device comprises N master devices, N being an integer greater than or equal to one; and
wherein said selecting is based on a reliability of said one network device and a reliability of each of said N backup devices,
wherein said selecting comprises:
grouping said plurality of network devices into M pools of prospective backups, each network device in a pool of prospective backups having the same reliability, M being an integer greater than or equal to one;
choosing the pool of prospective backups having the highest reliability as the current pool of prospective backups;
setting a current backup level to a first backup level, said backup level indicating the relative order in which a backup network device will, in the event of unavailability of a particular network device to which said backup network device is assigned as well as the unavailability of all other network devices assigned as backup network devices to said particular network device at lower backup levels, assume the role of said particular network device in relation to said other backup network devices;
assigning, at the current backup level, network devices from the current pool of prospective backups to said plurality of network devices in increasing order of reliability of the assignee network devices such that no network device is an assignee of more than one backup network device at the current backup level, until either;
(a) every network device in the current pool of prospective backups has been assigned as a backup network device N times; or
(b) each of said plurality of network devices is an assignee of a backup network device at the current backup level.

64. The machine-readable medium of claim 63 further comprising machine-executable code for, upon the occurrence of (a):
choosing another pool of prospective backups as the current pool of prospective backups in decreasing order of reliability; and
repeating said assigning.

65. The machine-readable medium of claim 64 further comprising:
machine-executable code for repeating said choosing and said repeating until each of said plurality of network devices is an assignee of N backup network devices.

66. The machine-readable medium of claim 63 further comprising machine-executable code for, upon the occurrence of (b):
if the current backup level is less than N, incrementing the current backup level to a next backup level; and
repeating said assigning.

67. The machine-readable medium of claim 66 further comprising:
machine-executable code for repeating said incrementing and said repeating until each of said plurality of network devices is an assignee of N backup network devices.

68. The machine-readable medium of claim 63 further comprising machine-executable code for, upon detecting the unavailability of a master network device, assuming the role of said master network device.

69. The machine-readable medium of claim 68 wherein said assuming the role of said master network device is conditional upon detecting the unavailability of every other backup network device assigned as a backup to the same master network device at a lower backup level than said one network device.

70. The machine-readable medium of claim 68 further comprising machine-executable code for, after assuming the role of said master network device, tracking any changes to the received information from said master network device.

71. The machine-readable medium of claim 70 further comprising machine-executable code for, upon the occurrence of changes to the received information of said master network device:
identifying any other backup network devices assigned to said master network device; and
communicating said changes to said other backup network devices assigned to said master network device.

72. The machine-readable medium of claim 70 further comprising machine-executable code for, upon detecting availability of said master network device:
yielding the role of said master network device to said master network device; and
communicating any changes to the received information from said master network device to said master network device.

73. A machine-readable medium including machine-executable code for execution at one network device of a plurality of network devices, comprising:

machine-executable code for selecting at least one other network device of said plurality of network devices to act as a backup for said one network device, said selecting resulting in the selection of at least one backup network device;

machine-executable code for communicating information maintained by said one network device to each said backup network device, said communicated information for use by said backup network device in assuming the role of said one network device upon unavailability of said one network device; and machine-executable code for receiving information from at least one network device distinct from said one network device which has selected said one network device as its backup so as to become a master network device, said received information for use by said one network device in assuming the role of the master network device upon unavailability of the master network device, wherein said network devices are terminal sets capable of initiating and accepting calls and wherein unavailability comprises an inability to accept an incoming call.

74. The machine-readable medium of claim 73 further comprising machine-executable code for: determining whether a proposed destination network device is available; and initiating a call based on said determining.

75. The machine-readable medium of claim 74 wherein said initiating a call comprises, if said determining determines said proposed destination network device to be unavailable:

identifying a backup network device of said proposed destination network device; and initiating a call to said identified backup network device.

76. The machine-readable medium of claim 75 wherein said initiating a call to said identified backup network device is conditional upon determining said identified backup network device to be available.

77. The machine-readable medium of claim 76 further comprising machine-executable code for repeating said identifying and said initiating until either an identified backup network device is found to be available or until it is determined that said proposed destination network device has no available backup network devices.

78. The machine-readable medium of claim 77 further comprising machine-executable code for, if it is determined that said proposed destination network device has no available backup network devices, accepting said call at said one network device.

* * * * *